US012724591B2

(12) United States Patent
Pike et al.

(10) Patent No.: US 12,724,591 B2
(45) Date of Patent: Sep. 1, 2026

(54) BLOCK TEMPLATE CREATION

(71) Applicant: ADP, Inc., Roseland, NJ (US)

(72) Inventors: Yair Pike, New York, NY (US); Harshita Daddala, New York, NY (US); Elizabeth Gao, New York, NY (US); Lauren Miller, New York, NY (US); Claire Casaregola, New York, NY (US); Michael Greene, New York, NY (US)

(73) Assignee: ADP, Inc., Roseland, NJ (US)

( * ) Notice: Subject to any disclaimer, the term of this patent is extended or adjusted under 35 U.S.C. 154(b) by 22 days.

(21) Appl. No.: 18/443,096

(22) Filed: Feb. 15, 2024

(65) Prior Publication Data

US 2024/0427569 A1 Dec. 26, 2024

Related U.S. Application Data

(63) Continuation of application No. 17/063,211, filed on Oct. 5, 2020, now abandoned.

(51) Int. Cl.
*G06F 8/34* (2018.01)
*G06F 8/35* (2018.01)

(52) U.S. Cl.
CPC . *G06F 8/34* (2013.01); *G06F 8/35* (2013.01)

(58) Field of Classification Search
CPC ..... G06F 8/34; G06F 8/35; G06F 8/33; G06F 8/36
See application file for complete search history.

(56) References Cited

U.S. PATENT DOCUMENTS 7,665,062 B1 * 2/2010 Bauer ........................ G06F 8/34 717/109
10,028,116 B2 * 7/2018 Riva ........................ H04W 4/60
10,747,390 B1 8/2020 Ranabahu et al.
11,113,038 B1 * 9/2021 Azaroff ..................... G06F 8/38
2014/0129924 A1 * 5/2014 Le Bescond de Coatpont ............ G06F 16/986 715/234
2015/0331680 A1 * 11/2015 Fee ........................ G06F 16/172 717/146
2017/0315786 A1 * 11/2017 Rogers ...................... G06F 8/35

(Continued)

OTHER PUBLICATIONS

Increase productivity by using custom code snippets, Feb. 4, 2019, Aaina Jain (Year: 2019).*

(Continued)

*Primary Examiner* — Noor Alkhateeb
(74) *Attorney, Agent, or Firm* — Foley & Lardner LLP

(57) ABSTRACT

A method, computer system, and computer program create a template in an integrated development environment. A set of tiles is displayed within a first area of a graphical user interface. Each tile corresponds to a set of data nodes that are composable into structured data objects according to a domain-specific language. A structured data object is composed from a subset of the tiles. The subset is displayed within a second area of the graphical user interface according to a context of the data nodes. Values are applied to properties of data nodes of the subset according to the context of the data nodes in the structured data object. The template is created from selected tiles of the subset. The template includes the values for the properties as-applied within the context.

20 Claims, 17 Drawing Sheets

(56) References Cited

U.S. PATENT DOCUMENTS

| | | | | |
|---|---|---|---|---|
| 2017/0322716 | A1* | 11/2017 | Khoyi | G06F 8/35 |
| 2017/0322783 | A1 | 11/2017 | Khoyi et al. | |
| 2018/0081640 | A1* | 3/2018 | Collins | G06F 8/34 |
| 2019/0042554 | A1 | 2/2019 | Aylett | |
| 2019/0138678 | A1* | 5/2019 | Young | G06F 30/30 |
| 2019/0236825 | A1 | 8/2019 | Straub | |
| 2019/0278442 | A1 | 9/2019 | Liang | |
| 2019/0317735 | A1* | 10/2019 | Duan | G06F 8/34 |
| 2020/0097266 | A1 | 3/2020 | Lodhia et al. | |
| 2021/0149791 | A1* | 5/2021 | Brak | G06F 8/77 |

OTHER PUBLICATIONS

"Reusing Design Elements using the Snippets Panel in Altium Designer", Feb. 28, 2018 (Year: 2018).

US Office Action issued in corresponding U.S. Appl. No. 17/063,211, dated Sep. 15, 2023 (20 pages).

US Office Action issued in corresponding U.S. Appl. No. 17/063,211 dated Mar. 17, 2023 (16 pages).

US Office Action issued in corresponding U.S. Appl. No. 17/063,211, dated Feb. 4, 2022 (17 pages).

US Office Action issued in corresponding U.S. Appl. No. 17/063,211, dated Jun. 13, 2022 (19 pages).

US Office Action issued in corresponding U.S. Appl. No. 17/063,211, dated Mar. 18, 2022 (19 pages).

US Office Action issued in corresponding U.S. Appl. No. 17/063,211, dated Oct. 6, 2022 (19 pages).

* cited by examiner

Tile Templates

Search for name, caption, ID, or mini app

| Name and ID ▼ | Description | |
|---|---|---|
| Single Table<br>198764819237530946809386 | A simple listing | |
| Single Table with Metrics<br>198764819237530946809386 | Explain best usecase for your template. Maximum 72 characters. | |
| Single Table with Horizontal Tabs<br>2476785091378498a9h471 | Display multiple listings without losing performance | |
| Single Table with Highlighted Section<br>jh874ij72638hh929aow4 | Display most important info first but also provide full data | |
| **Multi-Table with Section**<br>383651asirk81628752a | **Explain best usecase for your template. Maximum 72 characters.** | **Edit** |
| Multi-Table with Vertical Tabs<br>3487716587ja9835lb | Display multiple listings on the same page without losing performance | |
| Grid of Cards<br>a97287935dkm97385 | Most efficient way to display multiple short info | |
| Card Rows<br>aa9983489wdjv119890gn48 | A great way to quickly compare multiple short info | |
| Large Modal<br>3449682528ahbw834969ls754987 | Get Input from user without losing context from the previous screen | |
| Small Modal with picklist<br>3487716587ia9835lb | Display most important info first but also provide full data | |

Cancel Select

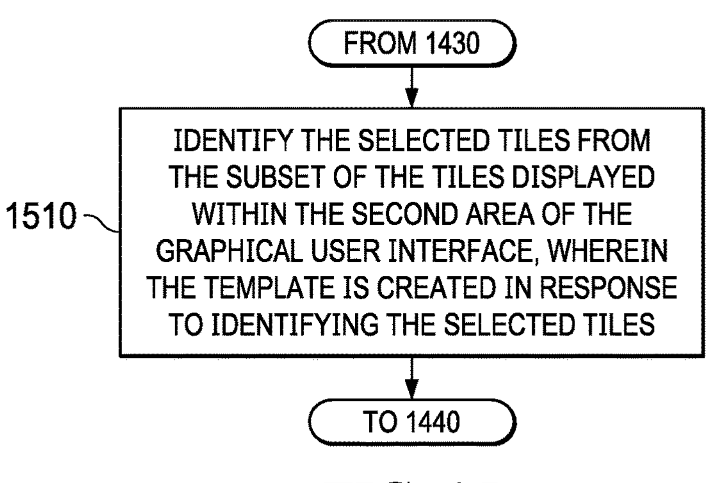
FIG. 15
FROM 1430
DISPLAY A MODAL OVERLYING THE FIRST AREA, THE SECOND AREA, OR COMBINATIONS THEREOF
1610
RECEIVE WITHIN THE MODAL, INFORMATION ABOUT THE TEMPLATE
1620
TO 1440
FIG. 16
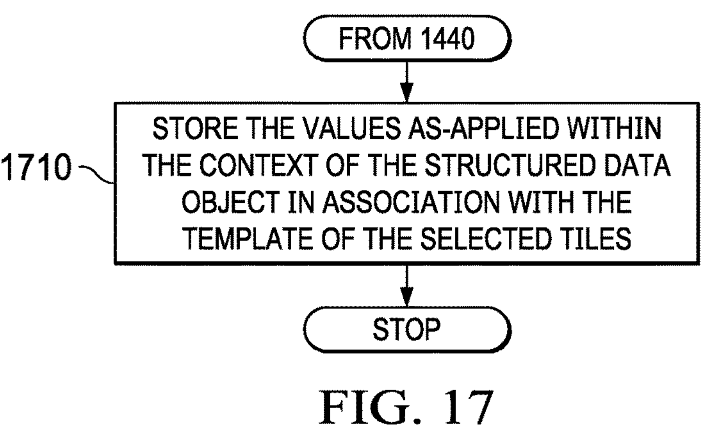
FIG. 17

BLOCK TEMPLATE CREATION

BACKGROUND

1. Field

The present disclosure relates to methods and devices for creating special purpose computers whose hardware and programming enable transformation of a user interface and transformation of the function of a computer such that an untrained user may develop applications.

2. Description of the Related Art

Currently, when a new computer program is desired, a trained programmer uses one or more specialized computer languages to create code. The code instructs a computer to perform a desired function.

In most cases, even for simple programs, the programmer will have extensive training in order to write code that will be capable of creating the desired computer functionality. In the case of complex software, the programmer may need to develop an architecture for the computer program, and then write the code to implement the architecture. For a large project, an entire team of trained programmers may be needed to create the desired code.

Thus, the process of coding is complex, expensive, and, for some individuals beyond their ability. For most individuals, the solution to providing a computer with a desired functionality is to purchase pre-programmed software to enable the desired functionality. For example, a user desiring to use a computer to perform business accounting may purchase an accounting program that provides a computer with the functionality of performing accounting procedures on the computer.

Nevertheless, a user may desire specialized functionality for the computer that is not currently for sale, or may desire to modify an existing program. However, unless that user is a trained programmer and is willing to expend the resources needed to code a new program, the user will not be able to use the desired specialized functionality on the computer.

SUMMARY

According to one embodiment of the present invention, a method is provided for creating a template in an integrated development environment. The method includes displaying a set of tiles within a first area of a graphical user interface. Each tile corresponds to a set of data nodes that are composable into structured data objects according to a domain-specific language of the integrated development environment. The method includes composing a structured data object from a subset of the tiles according to the domain-specific language of the integrated development environment. The subset is displayed within a second area of the graphical user interface according to a context of the data nodes of the structured data object. The method includes applying values to properties of data nodes of the subset according to the context of the data nodes of the structured data object. The method includes creating the template from selected tiles of the subset. The template includes the values for the properties as-applied within the context of the data nodes of the structured data object.

According to another embodiment of the present invention, a template creation system is provided for creating a template in an integrated development environment. The template creation system includes a display system having a graphical user interface displayed thereon, and a computer system having a template creator therein. The template creator is configured to display a set of tiles within a first area of the graphical user interface. Each tile corresponds to a set of data nodes that are composable into structured data objects according to a domain-specific language of the integrated development environment. The template creator is further configured to compose a structured data object from a subset of the tiles according to the domain-specific language of the integrated development environment. The subset is displayed within a second area of the graphical user interface according to a context of the data nodes of the structured data object. The template creator is further configured to apply values to properties of data nodes of the subset according to the context of the data nodes of the structured data object. The template creator is further configured to create the template from selected tiles of the subset. The template includes the values for the properties as-applied within the context of the data nodes of the structured data object.

According to yet another embodiment of the present invention, a computer program product for creating a template in an integrated development environment comprises a computer-readable-storage media with program code stored on the computer-readable storage media. The program code includes code for displaying a set of tiles within a first area of a graphical user interface. Each tile corresponds to a set of data nodes that are composable into structured data objects according to a domain-specific language of the integrated development environment. The program code includes code for composing a structured data object from a subset of the tiles according to the domain-specific language of the integrated development environment. The subset is displayed within a second area of the graphical user interface according to a context of the data nodes of the structured data object. The program code includes code for applying values to properties of data nodes of the subset according to the context of the data nodes of the structured data object. The program code includes code for creating the template from selected tiles of the subset. The template includes the values for the properties as-applied within the context of the data nodes of the structured data object

BRIEF DESCRIPTION OF THE DRAWINGS

FIG. 8 is a graphical user interface having a selected subset of data nodes according to an illustrative example;

FIG. 12 is a first example of a template selection modal according to an illustrative example;

FIG. 15 is a flowchart of a process for creating a template from a selected subset of data nodes according to an illustrative example;

FIG. 16 is a flowchart of a process for receiving template information according to an illustrative example;

FIG. 17 is a flowchart of a process for storing template information according to an illustrative example;

DETAILED DESCRIPTION

Figure 1:
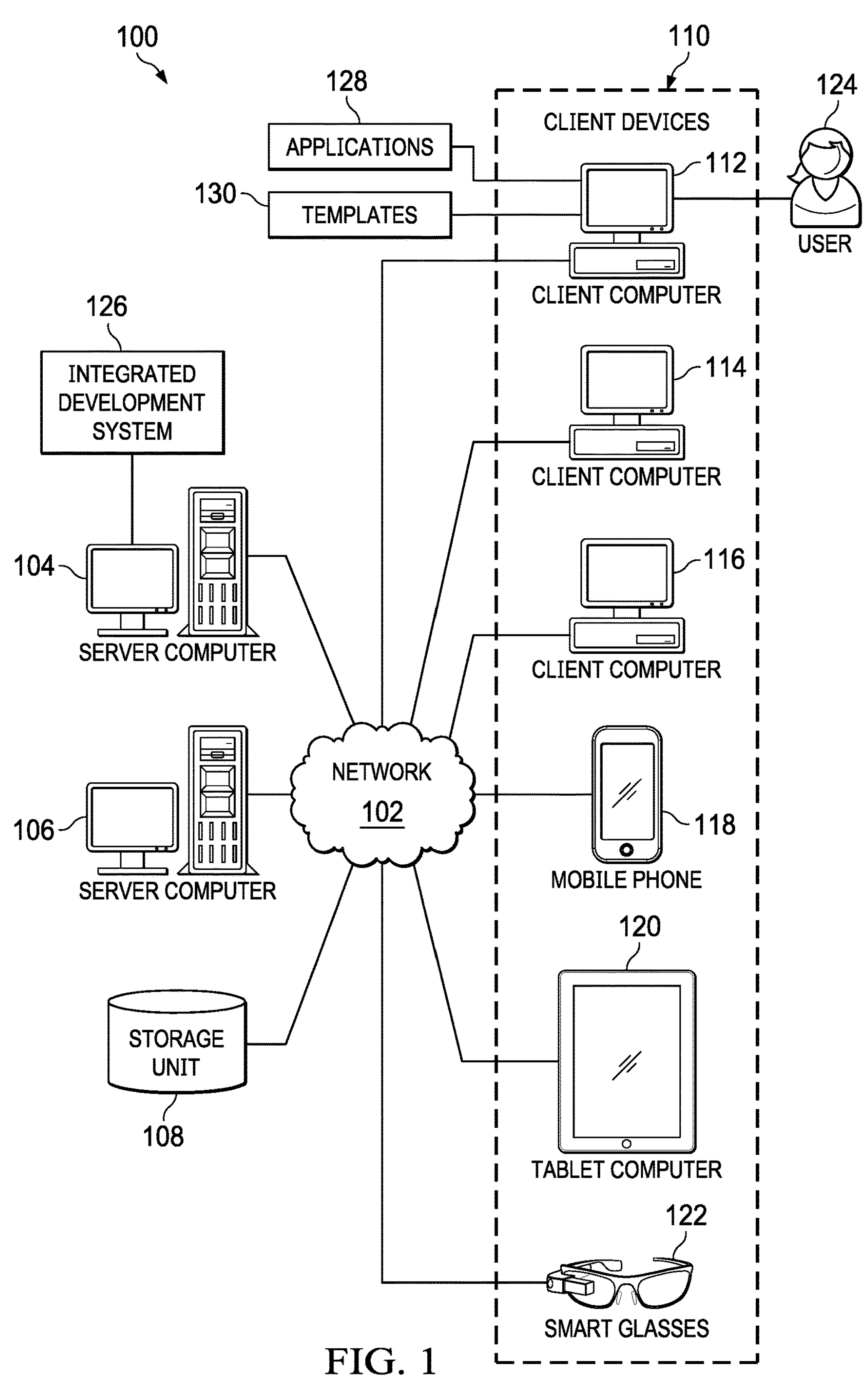
FIG. 1 is a pictorial representation of a network of data processing systems in which illustrative embodiments may be implemented.

The illustrative embodiments recognize and take into account one or more different considerations. For example, the illustrative embodiments recognize and take into account that an integrated development environment makes application programming easier for users with little to no background in computer software development. Instead of using traditional hand-coded computer programming, an integrated development environment enables developers to create applications using a visual user interface in combination with model-driven logic. Low-code development platforms reduce the amount of traditional hand coding, enabling accelerated delivery of business applications.

The illustrative embodiments recognize and take into account that as users gain familiarity with the integrated development environment, repeated interactions with graphical elements become tedious. While an integrated development environment allows inexperienced developers to easily drag-and-drop pre-built features to an application canvas, these repeated actions decrease development efficiency for experienced users.

Furthermore, the illustrative embodiments recognize and take into account that low knowledge barrier of an integrated development environment can create inconsistencies in the application architecture, user experience (UX) and user interface (UI). Different development teams building out different applications in different ways create disparity in both the structure and presentation of related software products.

The illustrative embodiments recognize and take into account that developers building products in an integrated development environment can start their work easier and faster using block templates. The use of templates can enforce application consistency in all development works, such as the application architecture, user experience (UX) and user interface (UI).

Thus, the embodiments provide a method, system and computer program product for creating a template in an integrated development environment. In particular, a method may be present that helps an operator create a template more quickly and easily as compared to template creation using currently available integrated development software. Furthermore, the use of templates provided by the illustrative embodiments may enable application consistency more quickly and easily as compared to template creation using currently available integrated development software.

In one illustrative example, a method is present for creating a template in an integrated development environment. A set of tiles is displayed within a first area of a graphical user interface. Each tile corresponds to a set of data nodes that are composable into structured data objects according to a domain-specific language of the integrated development environment. A structured data object is composed from a subset of the tiles according to the domain-specific language of the integrated development environment. The subset is displayed within a second area of the graphical user interface according to a context of the data nodes of the structured data object. Values are applied to properties of data nodes of the subset according to the context of the data nodes of the structured data object. The template is created from selected tiles of the subset. The template includes the values for the properties as-applied within the context of the data nodes of the structured data object.

With reference now to the figures and, in particular, with reference to FIG. 1, a pictorial representation of a network of data processing systems is depicted in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server computer 104 and server computer 106 connect to network 102 along with storage unit 108. In addition, client devices 110 connect to network 102. As depicted, client devices 110 include client computer 112, client computer 114, and client computer 116. Client devices 110 can be, for example, computers, workstations, or network computers. In the depicted example, server computer 104 provides information, such as boot files, operating system images, and applications to client devices 110. Further, client devices 110 can also include other types of client devices such as mobile phone 118, tablet computer 120, and smart glasses 122. In this illustrative example, server computer 104, server computer 106, storage unit 108, and client devices 110 are network devices that connect to network 102 in which network 102 is the communications media for these network devices. Some or all of client devices 110 may form an Internet of things (IoT) in which these physical devices can connect to network 102 and exchange information with each other over network 102.

Client devices 110 are clients to server computer 104 in this example. Network data processing system 100 may include additional server computers, client computers, and other devices not shown. Client devices 110 connect to network 102 utilizing at least one of wired, optical fiber, or wireless connections.

Program code located in network data processing system 100 can be stored on a computer-recordable storage medium and downloaded to a data processing system or other device for use. For example, program code can be stored on a computer-recordable storage medium on server computer 104 and downloaded to client devices 110 over network 102 for use on client devices 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented using a number of different types of networks. For example, network 102 can be comprised of at least one of the Internet, an intranet, a local area network (LAN), a metropolitan area network (MAN), or a wide area network (WAN). FIG. 1 is intended as an example, and not as an architectural limitation for the different illustrative embodiments.

As used herein, "a number of" when used with reference to items, means one or more items. For example, "a number of different types of networks" is one or more different types of networks.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

In this illustrative example, user 124 can use client computer 112 to interact with integrated development system 126. Integrated development system 126 is a system for creating applications 128 and templates 130 in an integrated development environment. Using Integrated development system 126, user 124 can manipulate graphical tiles, each representing well-defined blocks of code, in order to create applications 128 and templates 130.

In one illustrative example, user 124 can build templates 130 from scratch by linking individual tiles. In one illustrative example, user 124 can build templates 130 by selecting one or more tiles from a previously created application. Since the development platform uses blocks of code, current embodiments provide a way to create templates using placed blocks on on-campus of the graphical user interface. Unlike symbols, act as a master copy of the UI component with the ability to be overridden, templates act more as duplicates where users can edit the blocks without affecting the original template. Starting with an empty canvas, the user can add blocks and change the property values thereof. Thereafter, the user can select a subset of the composed blocks and create a template from the selected subset.

In contrast to creating templates using other integrated development environments, user 124 does not need to worry about property values applied inside tiles. Property values applied inside tiles of integrated development system 126 are automatically according to the context of the tiles. Therefore, when user 124 selects tiles to create templates, they only need to worry about which tiles are being selected.

The creation flow allows platform developers to either build a template by composing blocks on the canvas. Alternatively, blocks can be selected from any previously created documents and a template created therefrom. When a user selects blocks to create templates, they only need to worry about which blocks are selected-property values applied inside the blocks are automatically carried over and applied within the context of the composed template.

Integrated development system 126 provides a technical solution that overcomes a technical problem of quickly and easily generating new templates and applications. Integrated development system 126 creates templates 130 that include values for the properties as-applied within the context of the data nodes of a structured data object. In this manner, integrated development system 126 enables user 124 to create new applications in applications 128 and templates 130 more easily and quickly. As a result, this technical solution to the technical problem of generating templates and applications provides a technical effect in which a new templates and applications are generated more easily and quickly while requiring less knowledge or training from an operator.

Figure 2:
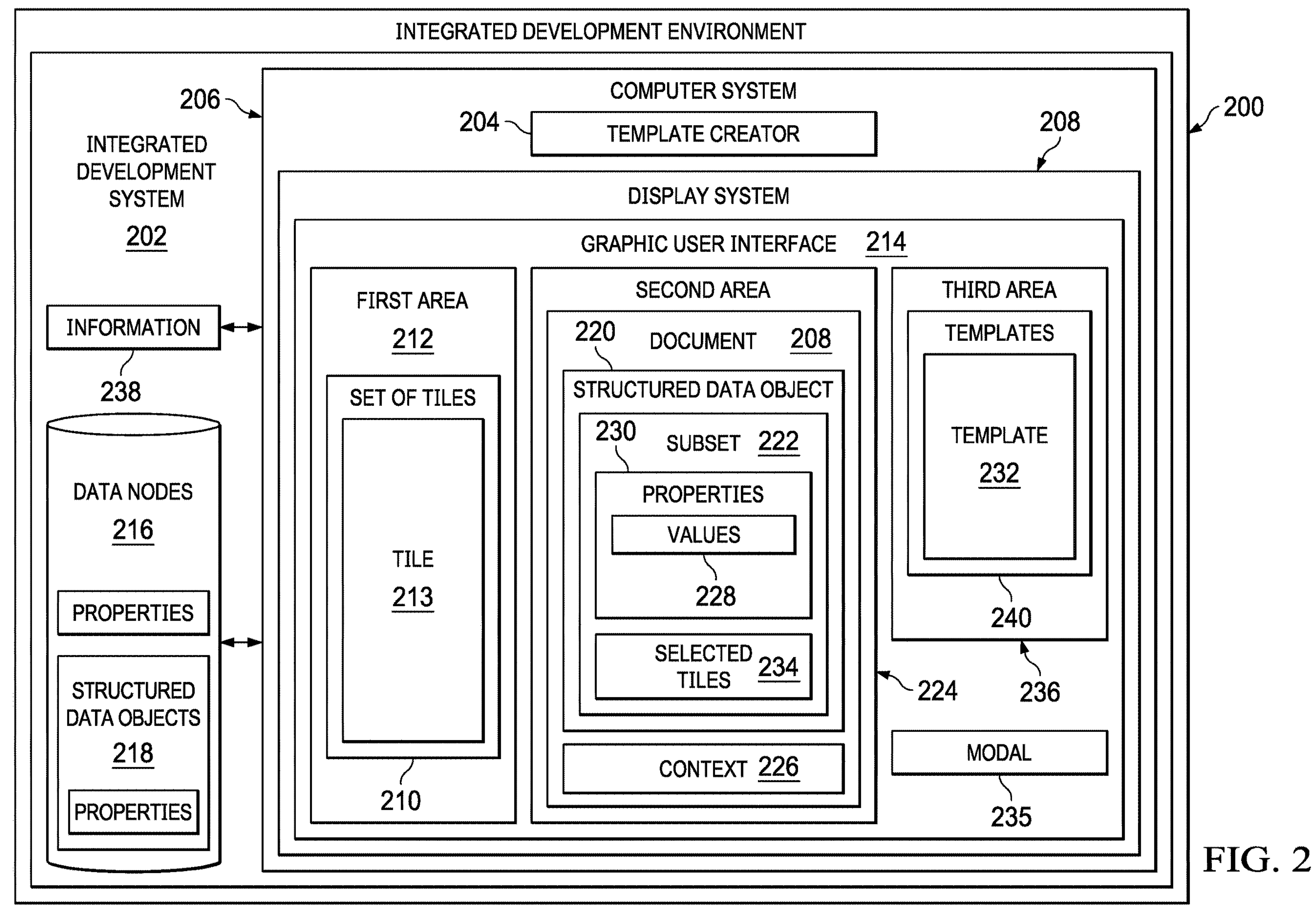
FIG. 2 is a block diagram of an integrated development environment in accordance with an illustrative embodiment.

With reference now to FIG. 2, a block diagram of an integrated development environment is depicted in accordance with an illustrative embodiment. In this illustrative example, integrated development environment 200 includes components that can be implemented in hardware such as the hardware shown in network data processing system 100 in FIG. 1.

In integrated development environment 200, a method for creating a template can be performed using integrated development system 202. In this illustrative example, the method for creating a template can be performed by template creator 204 running on computer system 206. The method for creating a template can be performed in a manner that enables new templates and applications to be generated more easily and quickly while requiring less knowledge or training from an operator.

In this illustrative example, integrated development system 202 includes a number of different components. As depicted, integrated development system 202 comprises computer system 206, template creator 204 in computer system 206, and display system 208.

Template creator 204 can be implemented in software, hardware, firmware or a combination thereof. When software is used, the operations performed by template creator 204 can be implemented in program code configured to run on hardware, such as a processor unit. When firmware is used, the operations performed by template creator 204 can be implemented in program code and data and stored in persistent memory to run on a processor unit. When hardware is employed, the hardware may include circuits that operate to perform the operations in template creator 204.

In the illustrative examples, the hardware may take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

Computer system 206 is a physical hardware system and includes one or more data processing systems. When more than one data processing system is present in computer system 206, those data processing systems are in communication with each other using a communications medium. The communications medium can be a network. The data processing systems can be selected from at least one of a computer, a server computer, a tablet computer, or some other suitable data processing system.

As depicted, template creator 204 in computer system 206 displays a set of tiles 210 within a first area 212 of a graphical user interface 214. In integrated development system 202, each tile, such as tile 213 corresponds to a set of data nodes, such as one or more of data nodes 216. Set of tiles 210 are composable into structured data objects 218 according to a domain-specific language of the integrated development system 202.

In this illustrative example, structured data object 220 is composed from a subset 222 of the tiles 210 according to the domain-specific language of the integrated development system 202. Template creator 204 displays the subset 222 within a second area 224 of the graphical user interface 214 according to a context 226 of the data nodes of the structured data object 220.

Template creator 204 applies values 228 to properties 230 of data nodes of the subset 222. Template creator 204 applies values 228 according to the context 226 of the data nodes of the structured data object 220.

Template creator 204 creates the template 232 from selected tiles 234 of the subset 222. The template 232 includes the values 228 for the properties 230 as-applied within the context 226 of the data nodes of the structured data object 220.

In one illustrative example, template creator 204 identifies selected tiles 234 from the subset 222 of the tiles displayed within the second area 224 of the graphical user interface 214. Template creator 204 creates template 232 in response to identifying the selected tiles 234.

In this illustrative example, template creator 204 can identify selected tiles 234 in a number of different ways. For example, integrated development system 126 can receive user input that contains a selection of one or more composed tiles in subset 222. User input can be generated by a human machine interface that comprises an input system and a display system 208, enabling a user, such as user 124 of FIG. 1, to interact with integrated development system 202.

In one illustrative example of creating the template, template creator 204 displaying a modal 235. Modal 235 is a graphical element that sits on top of the graphical user interface 214, overlying one or more of the first area 212, the second area 224, the third area 236. Modal 235 creates a mode that disables a main window of the graphical user interface 214, but keeps the main window visible with modal 235 as a child window in front of it. Users must interact with modal 235 before further interacting with one or more of the first area 212, the second area 224, the third area 236 of graphical user interface 214.

Template creator 204 receives information 238 within the modal 235. Information 238 is information about the template 232. Information 238 can include, for example, a name of the template, and a description of the template, including a best use case, best practices, recommendations, instructions, and notices, as well as other information relevant to the creation of template 232.

In one illustrative example, template creator 204 stores the values 228 as-applied within the context 226 of the structured data object 220 in association with the template 232 of the selected tiles 234. Template creator 204 displays template 232 as one of templates 240, which can be subsequently incorporated into additional structured data objects.

In one illustrative example, one or more technical solutions are present that overcome a technical problem with of quickly and easily generating new templates and applications. As a result, one or more technical solutions may provide a technical effect in which a new templates and applications are generated more easily and quickly while requiring less knowledge or training from an operator.

Computer system 206 can be configured to perform at least one of the steps, operations, or actions described in the different illustrative examples using software, hardware, firmware or a combination thereof. As a result, computer system 206 operates as a special purpose computer system in which template creator 204 enables a user to create new reports, applications, and templates more easily and quickly while requiring less knowledge or training. In particular, template creator 204 transforms computer system 206 into a special purpose computer system as compared to currently available general computer systems that do not have template creator 204.

In the illustrative example, the use of template creator 204 in computer system 206 integrates processes into a practical application for creating a template in an integrated development environment that increases the performance of computer system 206 In other words, template creator 204 in computer system 206 is directed to a practical application of processes integrated into template creator 204 in computer system in 206 that creates a template in an integrated development environment. In this illustrative example, template creator 204 in computer system 206 displays a set of tiles within a first area of a graphical user interface; composes a structured data object from a subset of the tiles according to the domain-specific language of the integrated development environment; applies values to properties of data nodes of the subset according to the context of the data nodes of the structured data object; and creates the template from selected tiles of the subset, wherein the template includes the values for the properties as-applied within the context of the data nodes of the structured data object. In this manner, template creator 204 in computer system 206 results in an improved integrated development system that provides a practical application of creating templates such that the functioning of computer system 206 is improved.

Figure 3:
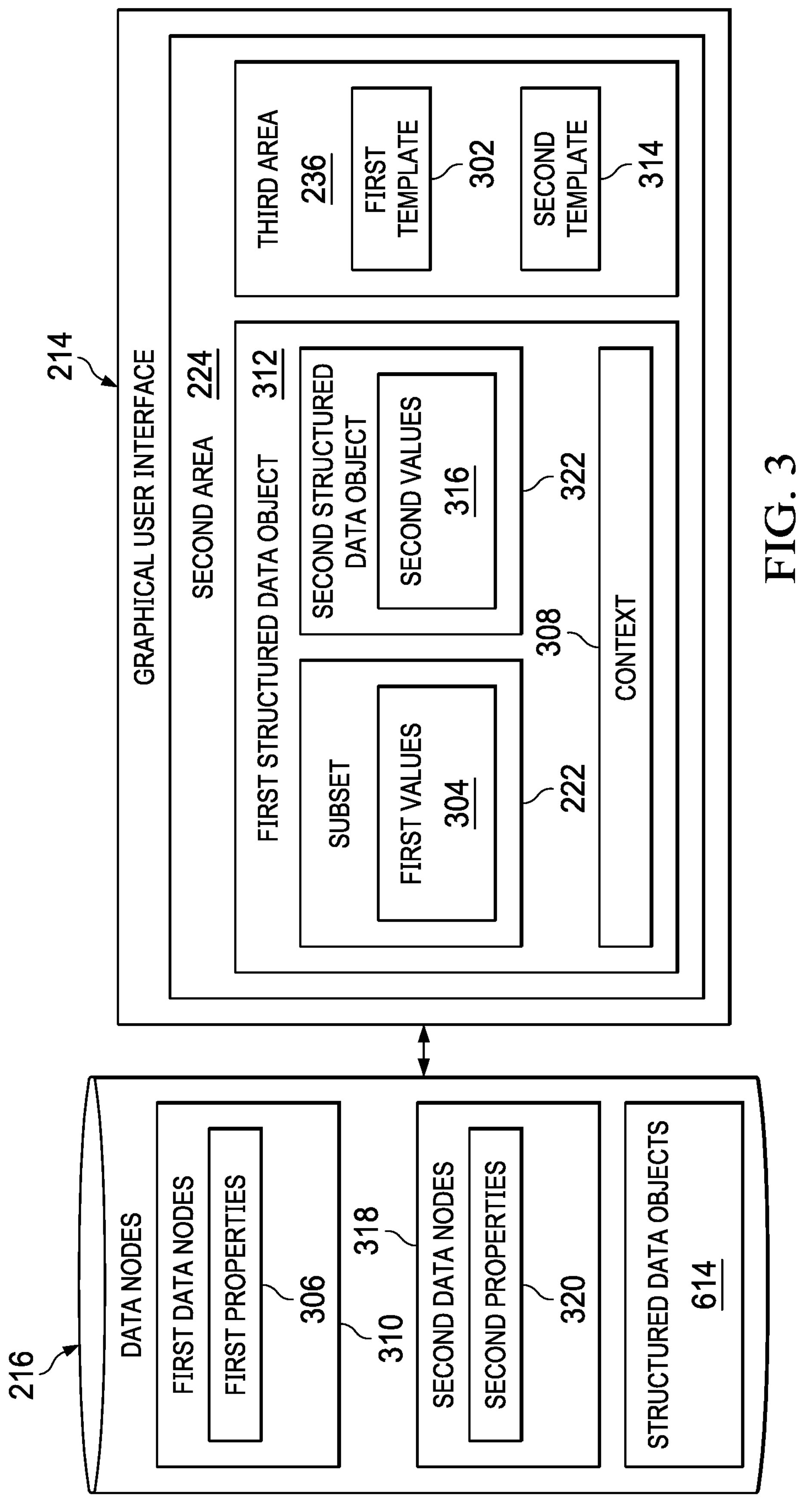
FIG. 3 is a block diagram of an integrated development system in accordance with an illustrative embodiment.

With reference now to FIG. 3, a block diagram of an integrated development system is depicted in accordance with an illustrative embodiment. In this illustrative example, integrated development system 202 includes components that can be implemented in integrated development environment 200 of FIG. 2.

In one illustrative example, a plurality of templates 240 can be composed together in second area 224 to create structured data object 220. For example, template creator 204 can identify a first template 302, including a first set of values 304 for a first set of properties 306 as-applied within a context 308 of first data nodes 310 of a first structured data object 312. Template creator 204 can identify a second template 314, including a second set of values 316 for a second set of properties 318 as-applied within a context 308 of second data nodes 320 of a second structured data object 322.

Template creator 204 composes the first structured data object 312 from the subset 222 of the tiles 210 and the second template 314. Template creator 204 applies the first values 304 to the first properties 306 according to the context 308 of both the first structured data object 312 and the second structured data object 322.

In one illustrative example, identical data nodes can simultaneously be added to multiple data nodes of a structured data object, while taking into account the individual contexts of the nodes. For example, when composing second structured data object 322, template creator 204 simultaneously adds data nodes of the second template 314 to both a first data node of the first structured data object 312 and a second data node of the first structured data object 312. Data nodes of the second template 314 are added to the first data node according to the context of the first data node, and are added to the second data node according to the context of the second data node.

The illustration of template creator 204 in FIGS. 2-3 is not meant to imply physical or architectural limitations to the manner in which an illustrative embodiment can be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

Figure 4:
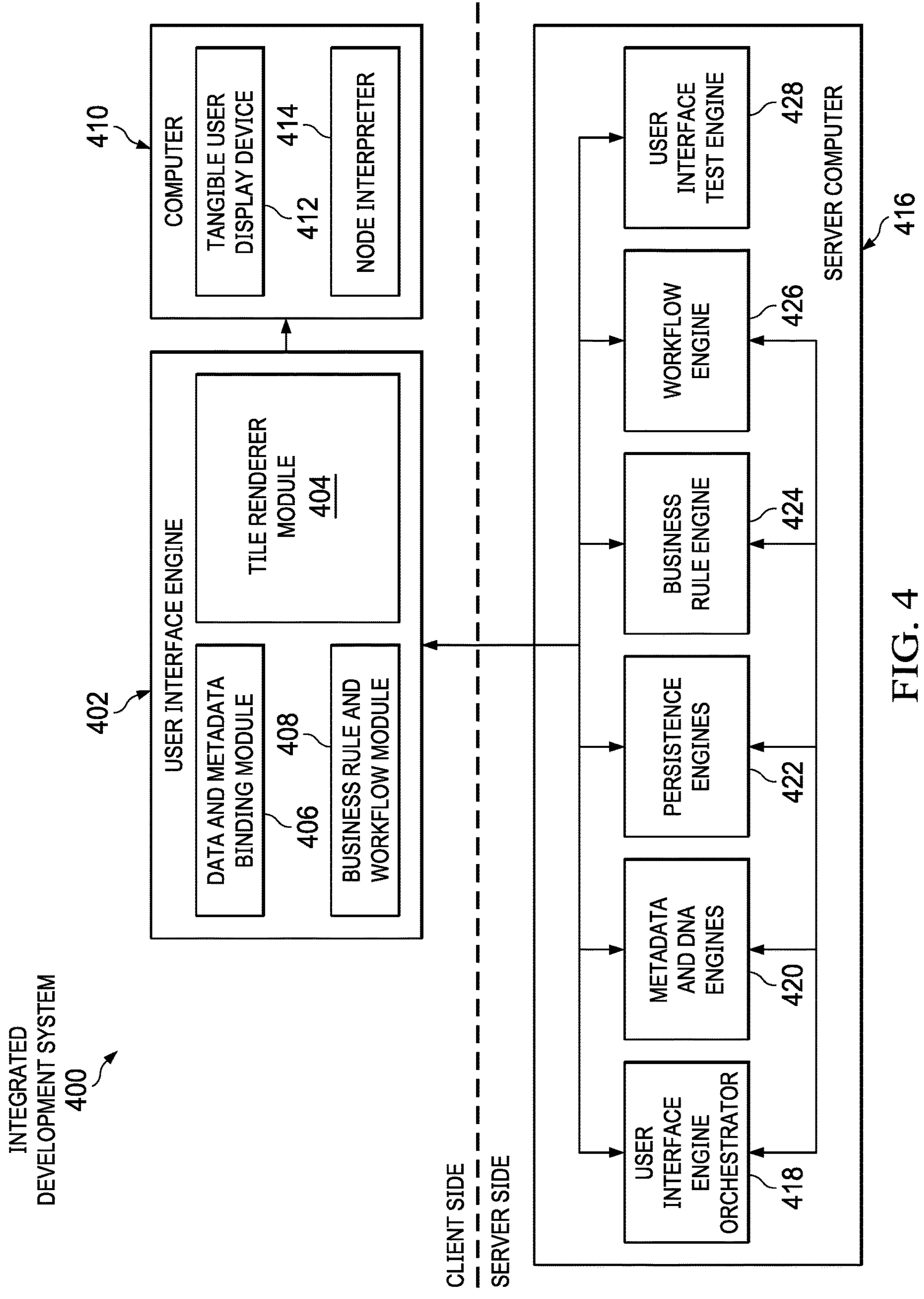
FIG. 4 is a block diagram illustrating an integrated development system data in accordance with an illustrative embodiment.

FIG. 4 is a block diagram illustrating an integrated development system depicted in accordance with an illustrative embodiment. Integrated development system 400 may be used to manipulate composable data nodes to build at least one of business rules, mini-apps, and apps. Integrated development system 400 is one example of integrated development system 202 of FIG. 2.

User interface engine 402 is computer code, underlying data and structured data objects which provide underlying functionality and implementation capability for application designers using application development system 400. Primarily, user interface engine 402 operates client-side, meaning that user interface engine 402 operates on a specific client user's computer, such as one or more of client computer 112, client computer 114, and client computer 116 of FIG. 1. In one illustrative example, user interface engine 402 could be a web browser or an extension to a web browser.

Underlying the user interface, user interface engine 402 may include one or more modules. As depicted, user interface engine 402 includes tile renderer module 404, data and metadata binding module 406, and business rule and workflow module 408. Each module may be considered a collection of software or computer code which implements the functionality of the module.

Tile renderer module 404 is computer code which computer 410 may use to render tiles on tangible user display device 412. Tile renderer module 404 may receive input from the user, from data and metadata binding module 406, and from business rule and workflow module 408 to change and manipulate both the functionality of computer 410, which is used to execute tile renderer module 404, as well as tangible user display device 412, which is used to display rendered tiles.

Data and metadata binding module 406 is computer code which computer 410 may use to bind data and structured data objects to the user interface, possibly a browser, so that user interface engine 402 may keep track of all of the data and structured data objects used in executing business rules and workflows, as well as rendering tiles. Additional details regarding the functionality of data and structured data object binding module 406 is described below with respect to how data and structured data objects are used in user interface engine 402.

Business rule and workflow module 408 is computer code which computer 410 may use to create, join, merge, or otherwise manipulate composable data nodes in order to create mini-apps, collections, and bundles. Business rule and workflow module 408 is the underlying code which allows a user to create mini-apps, collections, and bundles without the user having to code any of the software being developed. Using data and structured data objects tracked by data and metadata binding module 406, the user can manipulate tiles rendered by tile renderer module 404. Business rule and workflow module 408 uses these composable data nodes, together with work flows and business rules to create the mini-apps, collections, or bundles in a user-perceived codeless development environment.

Node interpreter 414 is hardware or software which is used to interpret or execute business rules in a business system. Metadata interpreter 414 can be software residing in a web browser on computer 410. However, the illustrative embodiments are not necessarily limited to only client computers or web browsers.

Metadata interpreter 414 is a code interpreter designed for a domain-specific language entirely composed of structured data objects. In one illustrative example, metadata interpreter 414 takes the form of an abstract syntax tree (AST) interpreter with the exception that the abstract syntax tree (AST) structure is composed of well-defined data nodes constructs, joined together in a domain-specific language. Because the data node constructs are well-defined when they are constructed, metadata interpreter 414 executes the composition of structured data objects without compilation. Data node constructs are composed into well-defined structured data objects according to selected block types and properties, replacing the tokenization and parsing that would otherwise occur during compilation.

In some illustrative embodiments, user interface engine 402 may take advantage of some server-side services operating on one or more server computers, such as server computer 416. "Server side" means that computer 410 communicates with server computer 416, possibly over a network such as the Internet. Server-side resources are provided to support user interface engine 402. While not always necessary for implementation of user interface engine 402, server-side resources can enhance the functionality of user interface engine 402.

For example, the server-side resources may include user interface engine orchestrator 418. In some exemplary illustrative embodiments, user interface engine orchestrator 418 may be considered part of user interface engine 402 such that user interface engine 402 operates partially both on computer 410, but also on one or more server computers, such as server computer 416.

User interface engine orchestrator 418 may serve as a proxy to speed up processing of user interface engine 402. User interface engine orchestrator 418 may retrieve structured data objects and then identify whether data queries are for customer data, business rules, or any other structured data objects. User interface engine orchestrator 418 may then request such data, objects, or code, from the data center operating server side. User interface engine orchestrator 418 may cache retrieved data, structured data objects, code, workflows, or objects to be sent back to user interface engine 402.

Server-side services may include other components other than user interface engine orchestrator 418. For example, server-side resources could include one or more metadata and DNA engines 420, which can be used to manage or provide structured data objects for use in user interface engine 402. Server-side resources may also include one or more persistence engines 422, which can be used to save work done using user interface engine 402. Server side resources may also include business rule engine 424, which may be used to create or store business rules that are used by user interface engine 402 in the user-perceived codeless building of mini-apps, collections, and bundles.

Server-side resources may also include workflow engine 426, which may be used to create or store workflows that are used by user interface engine 402 in the user-perceived codeless building of mini-apps, collections, and bundles.

Server-side resources may also include user interface test engine 428, which may be used to test both the functionality of user interface engine 402, possibly as well as the mini-apps, collections, and bundles created using user interface engine 402.

Figure 5:
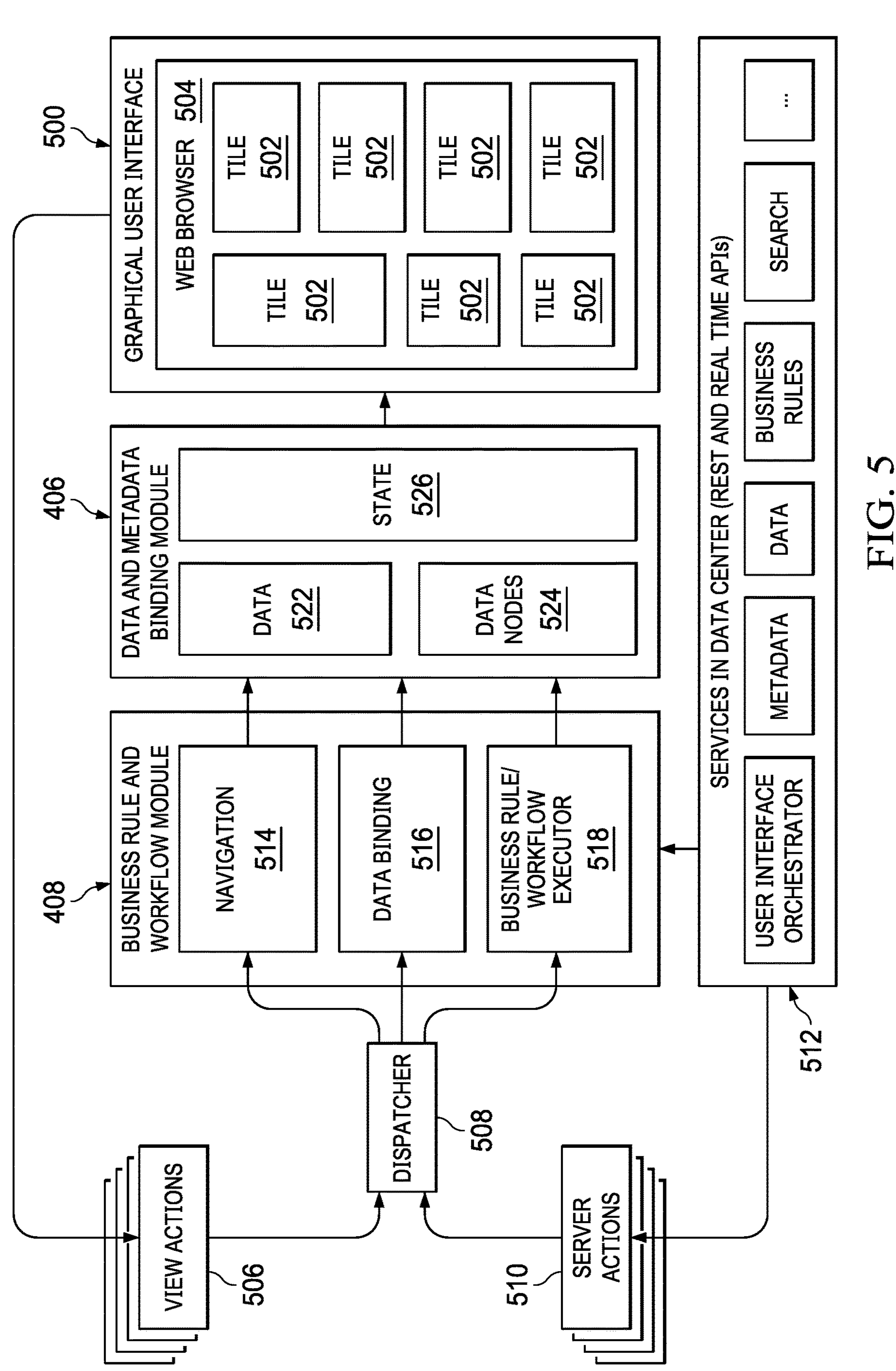
FIG. 5 is an illustration of a block diagram of an example of an operation of a user interface engine of an integrated development system data in accordance with an illustrative embodiment.

FIG. 5 is an illustration of a block diagram of an example of an operation of a user interface engine shown in FIG. 3, in accordance with an illustrative embodiment. The example shown in FIG. 5 does not necessarily limit operation of user interface engine 402 as shown in FIG. 4. Nevertheless, FIG. 5 may be read in conjunction with FIG. 4.

In an illustrative embodiment, tile renderer module 404 in FIG. 4 may be used to generate graphical user interface 500. Graphical user interface 500 may take the form of tiles 502 shown in web browser 504. Each of tiles 502 may represent a building block. Alternatively, a tile may represent a mini-app, a collection, or even a bundle. Users may interact with graphical user interface 500, triggering, for example, a "view actions" command 506.

These actions are sent to dispatcher 508, which may be part of user interface engine 302, shown in FIG. 3. Dispatcher 508 may send the actions to the business rule and workflow module via subscriptions registered with dispatcher 508. Dispatcher 508 may also send server actions 510 sent by data center 512 to business rule and workflow module 408 in FIG. 4 for use in combination with the actions started by the user.

Business rule and workflow module 408 may run queries and apply business rules and other logic. Business rule and workflow module 408 may provide navigation 514, data binding 516, and execution by business rules and workflows executor 518.

Data and metadata binding module 406 in FIG. 4 may apply changes to user interface state 520 held in memory. User interface state 520 may be held in a tree structure containing data 522, node 524, and tile state 526. In turn, tile renderer module 404 in FIG. 4 may render graphical user interface 500. Tile renderer module 404 may listen to state changes in the tree structure and efficiently update only data 522 and metadata 524 that need re-rendering.

Figure 6:
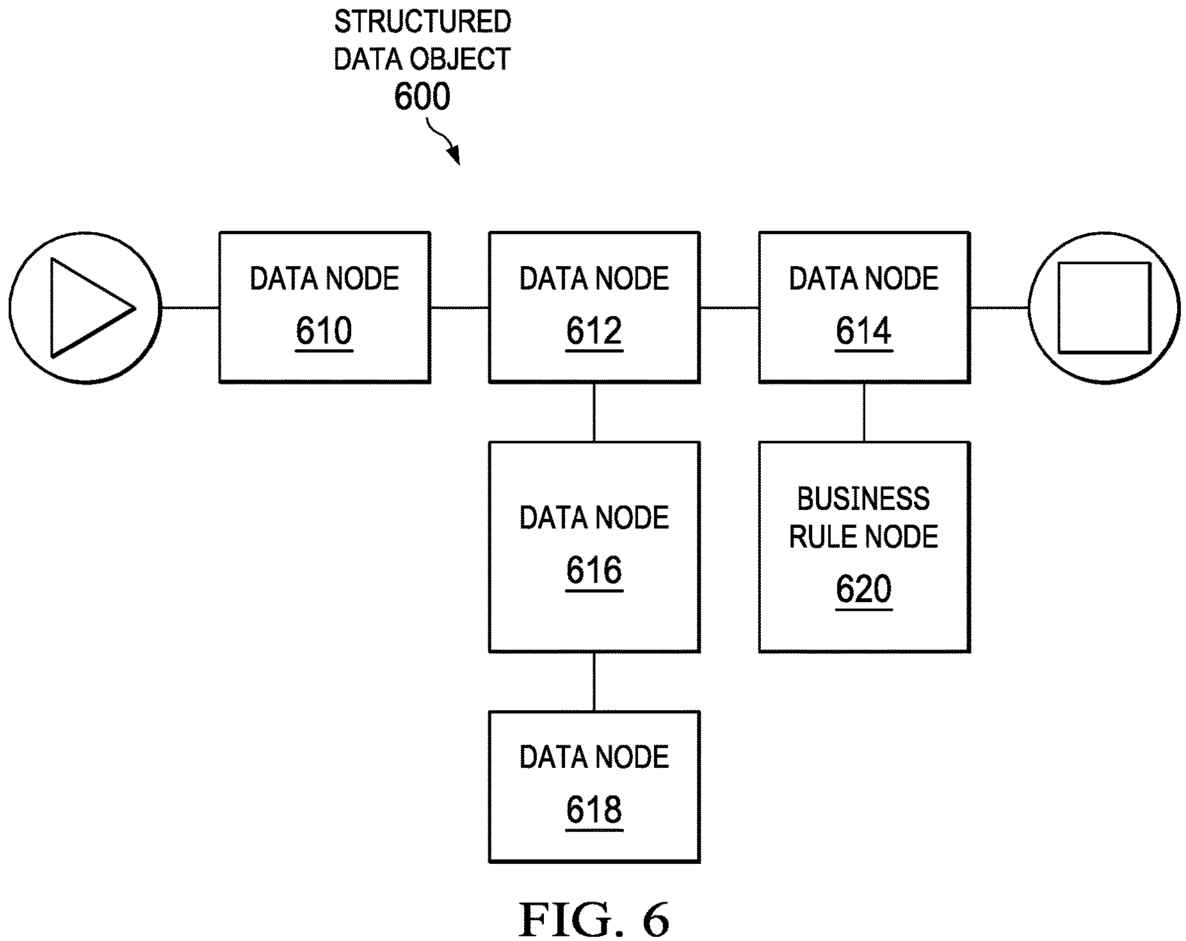
FIG. 6 is an illustration of a block diagram of a structured data object in accordance with an illustrative embodiment.

With reference next to FIG. 6, an illustration of a block diagram of a structured data object is depicted in accordance with an illustrative embodiment. Structured data object 600 is an example of a composition of well-defined data nodes that can be linked together according to a domain-specific language to create mini-apps, collections, or bundles in a user-perceived codeless development environment, such as application development system 300 of FIG. 3.

Structured data object 600 includes data nodes 610, 612, and 614. Data nodes 610, 612, and 614 are well-defined structured data objects that can be manipulated within data and metadata binding module 406 of FIG. 4 to create desired business rules. Tile renderer module 404 of user interface engine 302 may visually present data nodes 610, 612, and 614, enabling the user to build different business rules, mini-apps and apps in application development system 300 of FIG. 3. Each of data nodes 610, 612, and 614 correlate to one or more functions, which in turn can be interpreted by node interpreter 414 of FIG. 4 for implementing the corresponding business rule. The different permutations of the compositions of these functions, as well as differentiated input, enable the execution of the different business rule behaviors at runtime.

The functions of data nodes 610, 612, and 614 operate inside of a context defined at the beginning of the business rule execution step, which is the target object for all symbols defined in the course of the business rule execution, as well as for all input to and output from the business rule itself. In this manner, data nodes 610, 612, and 614 act as a configuration object to the code being executed, defining an execution context (or scope being executed against) to other joined data nodes.

For example, structured data object 600 further includes data node 616. Data node 616 provides additional context for execution of related data node 612.

Specifically, data node 616 may indicate that data node 612, as well as child data nodes thereof, should be interpreted within the context of data node 616.

Structured data object 600 further includes data node 618. Data node 618 provides additional context for execution of both related data node 612 and data node 616. For example, data node 618 may indicate that information required for execution of data node 612 should be requested and received from one or more web services. Data node 618 requests and returns the same context updated with the information received through the web services.

Structured data object 600 further includes business rule node 620. Business rule node 620 provides additional context for execution of related data node 614. Specifically, business rule node 620 may indicate a consuming service for receipt of business rule output provided by related data node 614. Business rule node 620 requests and returns information to a consuming service, such as a web page.

Figure 7:
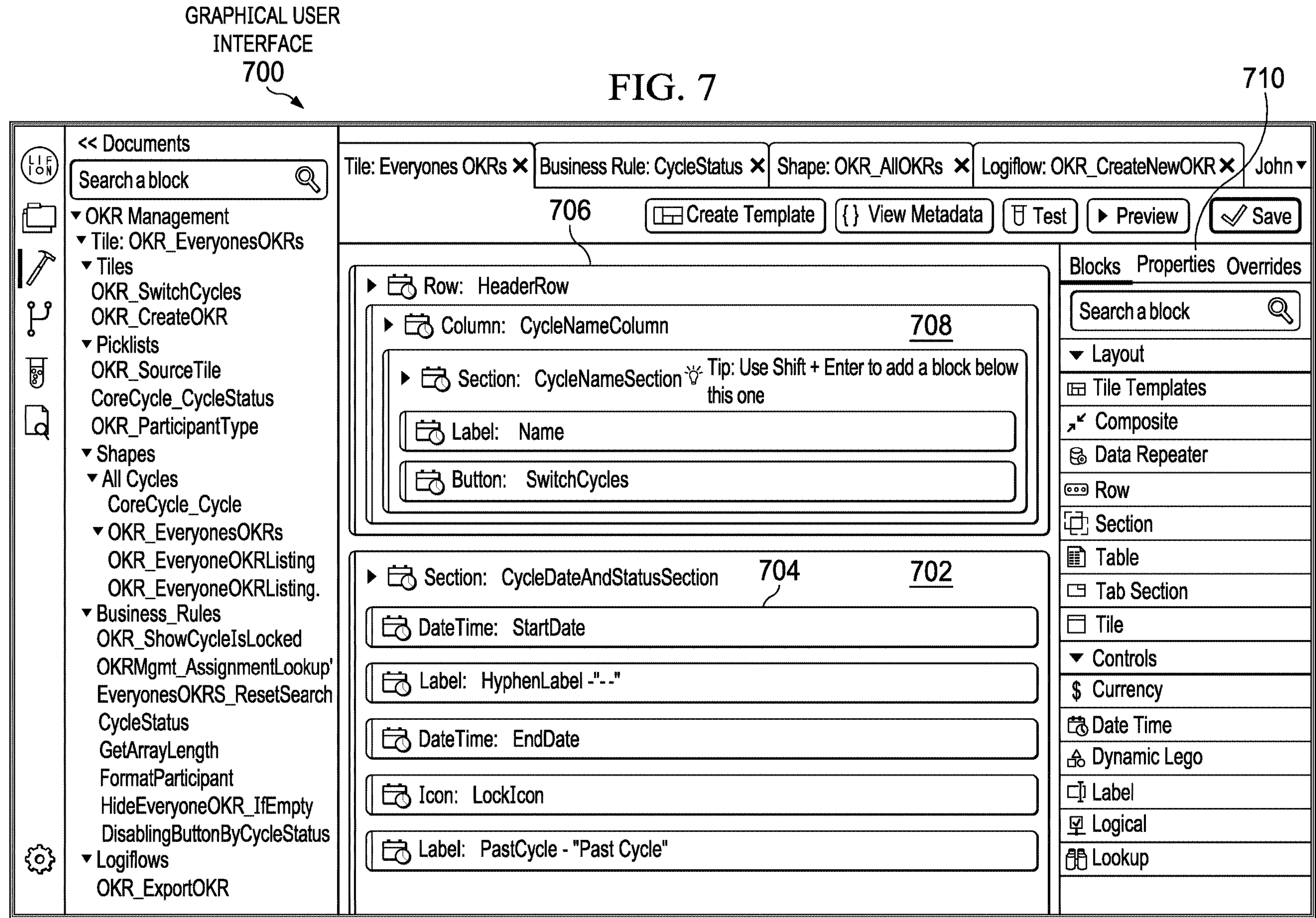
FIG. 7 is a graphical user interface for composing structured data objects according to a domain-specific language according to an illustrative example.

With reference next to FIG. 7, a graphical user interface for composing structured data objects according to a domain-specific language is depicted according to an illustrative example. Graphical user interface 700 is an example of graphical user interface 214 of FIG. 2.

As depicted, graphical user interface 700 includes a first area 702. First area 702 is an example of first area 212 of FIG. 2. First area 212 displays tiles 704. Tiles 704 are examples set of tiles 210, shown in block form in FIG. 2.

As depicted, graphical user interface 700 includes a second area 706. Second area 706 is an example of second area 224 of FIG. 2. Second area 706 displays a plurality of data nodes that have been linked together to form a structured data object 708 according to a domain-specific language. Dragging tiles from a first area 702 to second area 706 appends the corresponding set of data nodes into a structured data object 708 according to the context defined by parent nodes.

As depicted, graphical user interface 700 includes third area 710. Third area 710 is an example of third area 236 of FIG. 2. Third area 710 displays templates that can be selected for composing structured data object 708.

Figure 8:
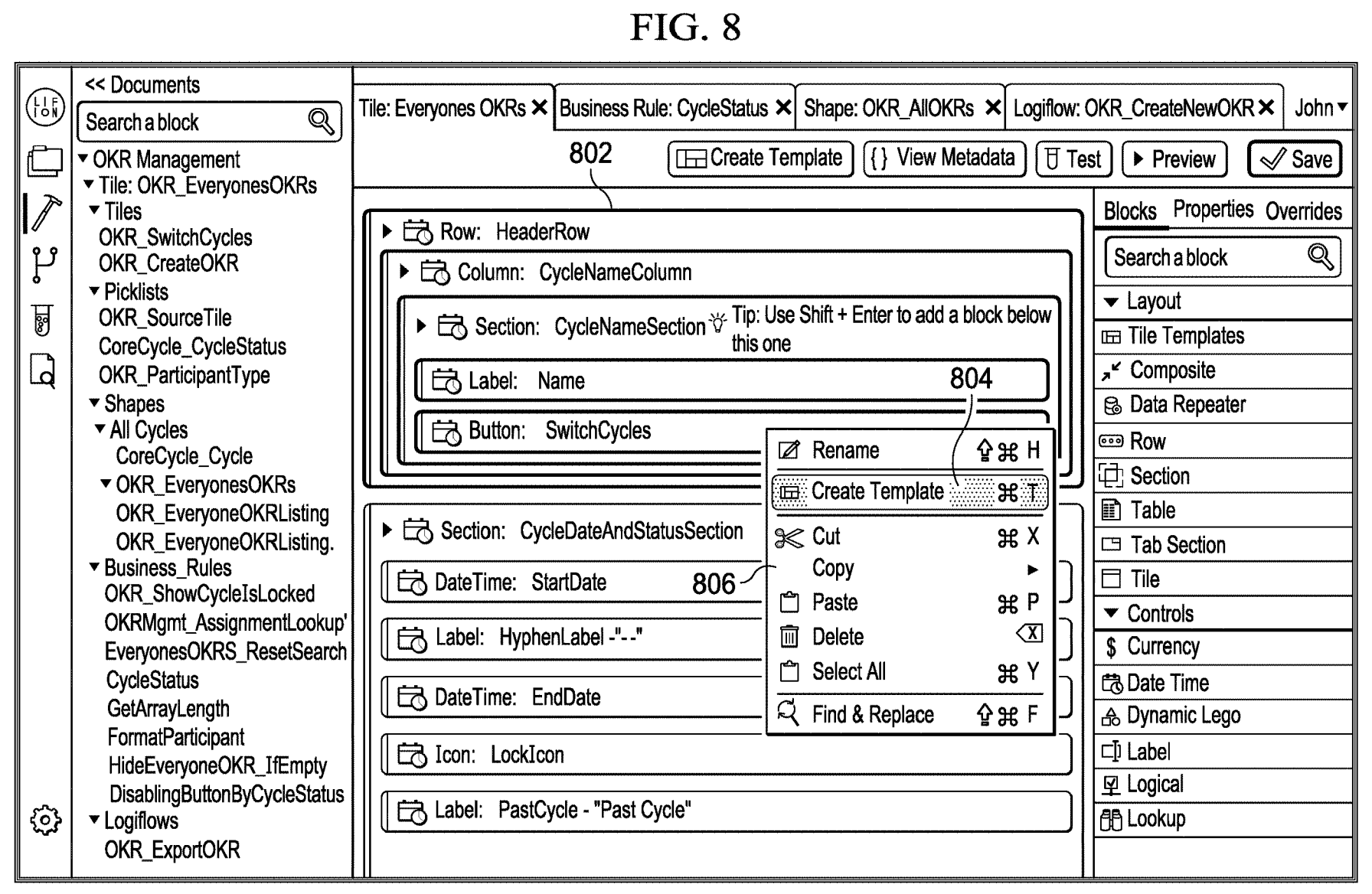

With reference next to FIG. 8, graphical user interface 700 is illustrated having a selected subset of data nodes according to an illustrative example. In an illustrative example, graphical user interface 700 displays selected subset 802 in response to receiving user input that selects subset 802 from within second area 706.

In an illustrative example, graphical user interface 700 displays button 804 in response to receiving user input subset 802. In one illustrative example, a user can create a new template from the selected subset 802 by "clicking" button 804. Alternatively, the user can "right-click" the selected subset 802, opening pop-up menu 806. A user can create a new template from the selected subset 802 by selecting an appropriate element from pop-up menu 806.

Figure 9:
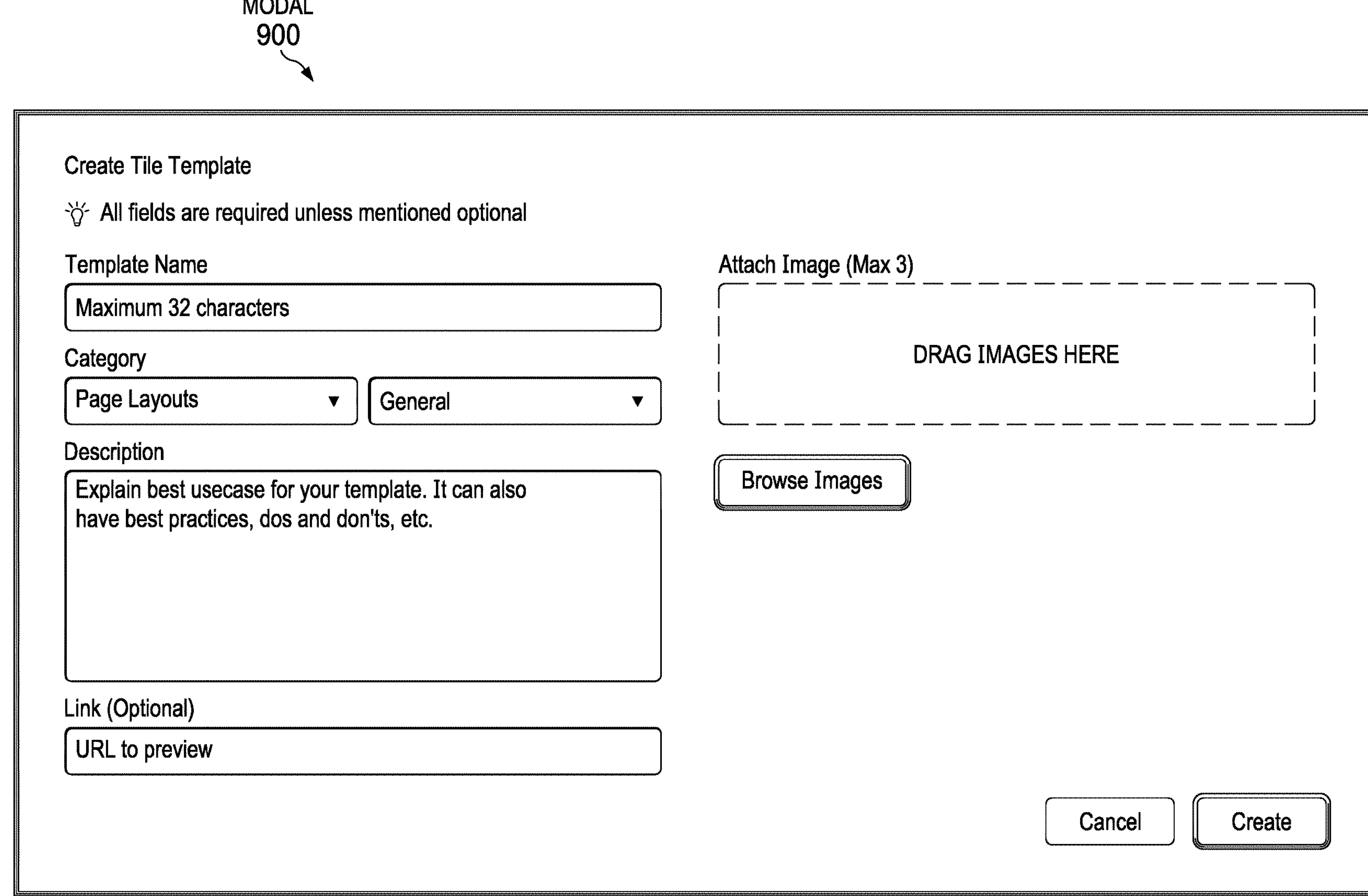
FIG. 9 is a template creation modal according to an illustrative example.

With reference next to FIG. 9, a template creation modal is depicted according to an illustrative example. Modal 900 is an example of modal 235 of FIG. 2. Graphical user interface can display modal 900 in response to receiving user interaction with either button 804 or an appropriate element from pop-up menu 806, both shown in FIG. 8.

Using modal 900, a user can enter information about the template to be created. The information can include, for example, a name of the template, and a description of the template, including a best use case, best practices, recommendations, instructions, and notices, as well as other information relevant to the creation of the template. Additionally, the user can attach runtime screenshots of the template as a reference for aiding the subsequent creation of new applications.

Figure 10:
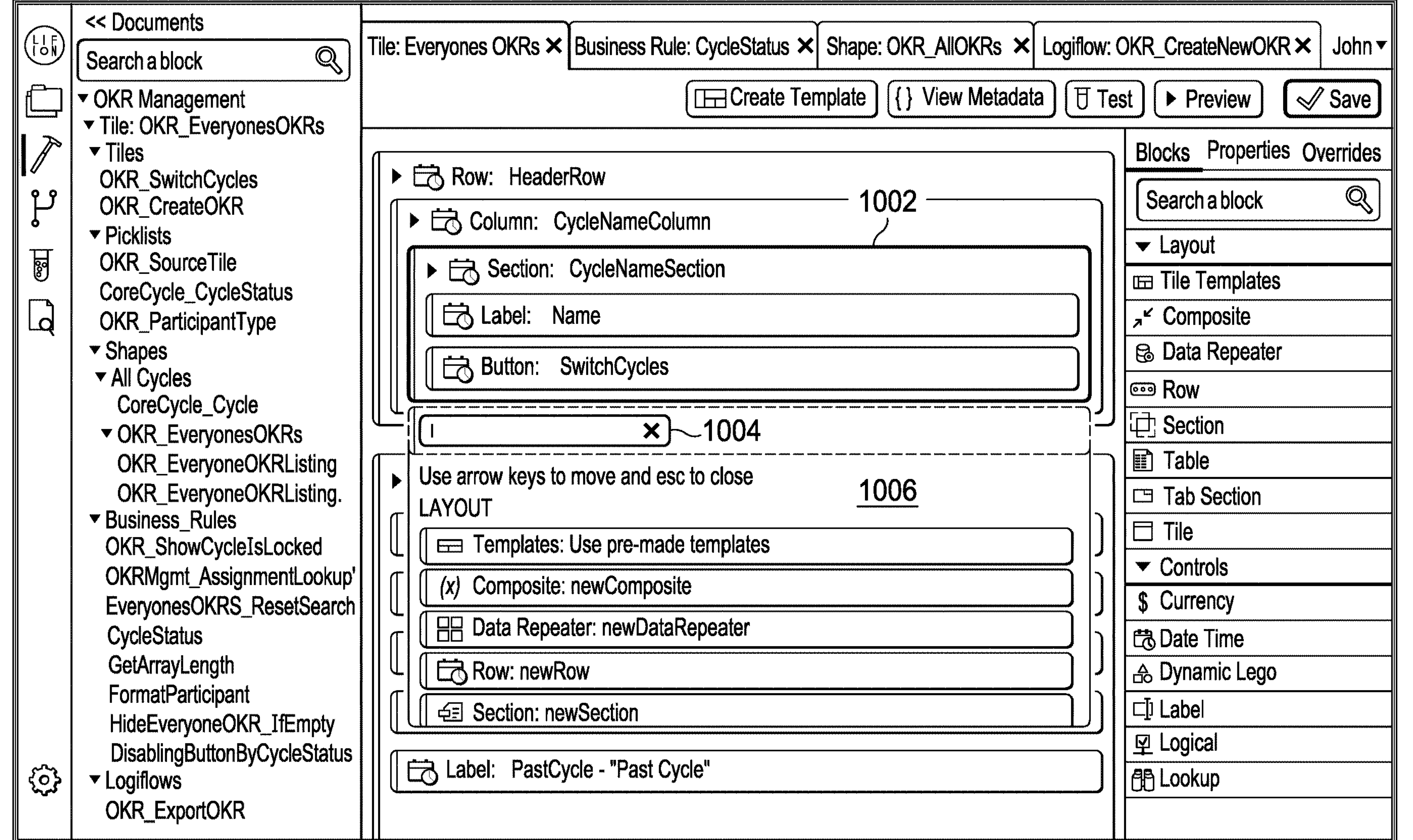
FIG. 10 is a graphical user interface having a drop zone for adding additional templates to a structured data object according to an illustrative example.

With reference next to FIG. 10, graphical user interface 700 is illustrated having a drop zone 1002 for adding additional templates to a structured data object according to an illustrative example.

When a new node 1004 is added to the structured data object 708, the user can "right-click" the new node 1004, opening pop-up menu 1006. A user can append a template to the existing structured data object 708 new by selecting an appropriate element from pop-up menu 1006. The template is added according to the context of structured data object 708.

Figure 11:
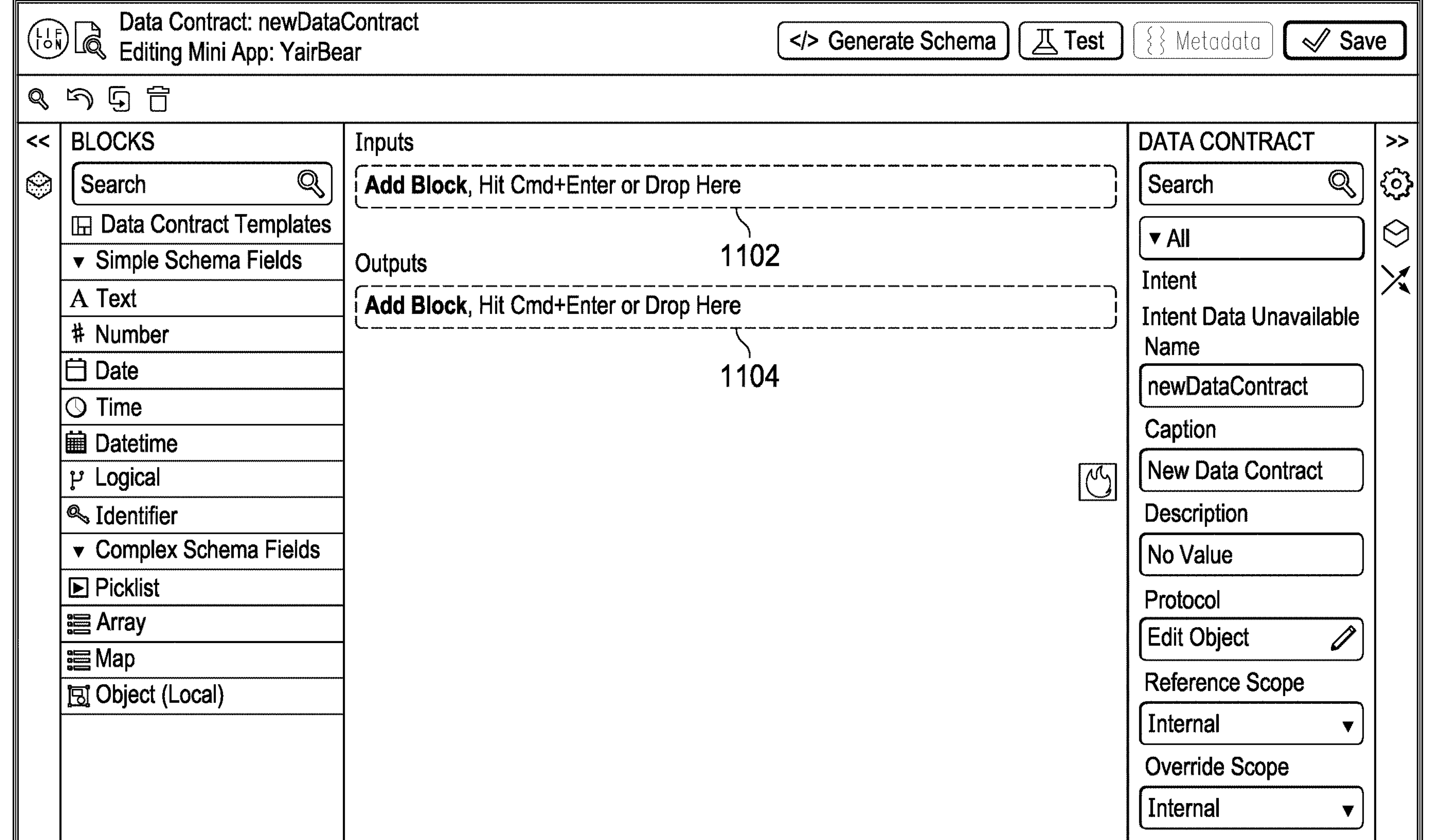
FIG. 11 is a graphical user interface having multiple drop zones for simultaneously adding additional templates to a plurality data nodes of structured data object according to an illustrative example.

With reference next to FIG. 11, graphical user interface 700 is illustrated having multiple drop zones for simultaneously adding additional templates to a plurality data nodes of structured data object according to an illustrative example.

When a new node 1102 and 1104 are added to the structured data object 708, the user can "right-click" 1 of the new nodes, opening pop-up menu 1004. A user can append a template to the existing structured data object 708 by selecting an appropriate element from pop-up menu 806. The template is added to the data nodes according to their local context within structured data object 708.

With reference next to FIG. 12, a first example of a template selection modal is depicted according to an illustrative example. Modal 1200 is an example of modal 235 of FIG. 2. Graphical user interface can display modal 1200 in response to receiving user interaction with the appropriate element from pop-up menu 1006 of FIG. 10.

A user can select one or more templates from modal 1200. The selected template will then be added to second area 706 of graphical user interface 700, according to the context of the structured data object 708.

Figure 13:
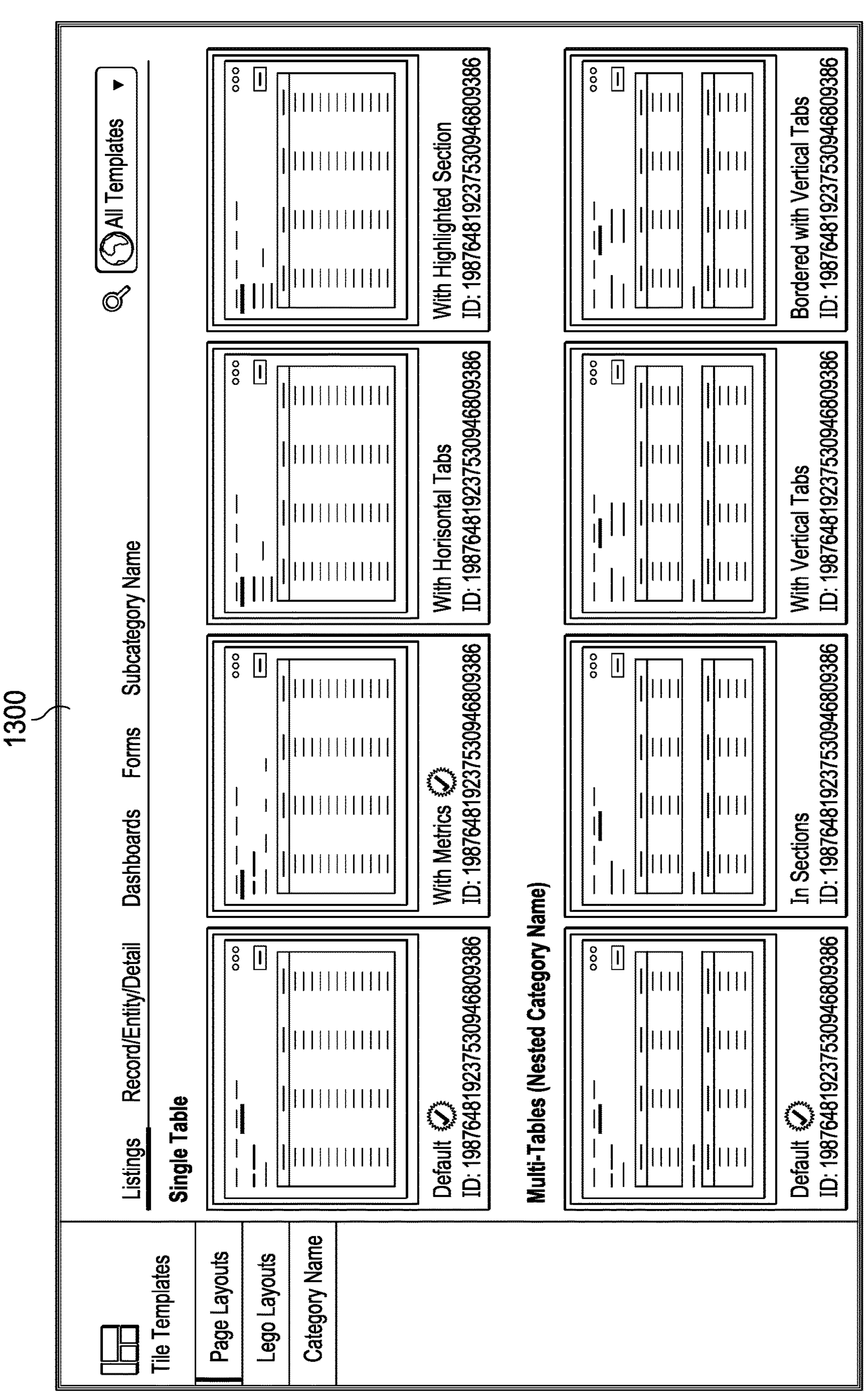
FIG. 13 is a first example of a template selection modal is depicted according to an illustrative example.

With reference next to FIG. 13, a first example of a template selection modal is depicted according to an illustrative example. Modal 1300 is an example of modal 235 of FIG. 2. Graphical user interface can display modal 1300 in response to receiving user interaction with the appropriate element from pop-up menu 1006 of FIG. 10.

A user can select one or more templates from modal 1300. The selected template will then be added to second area 706 of graphical user interface 700, according to the context of the structured data object 708.

Figure 14:
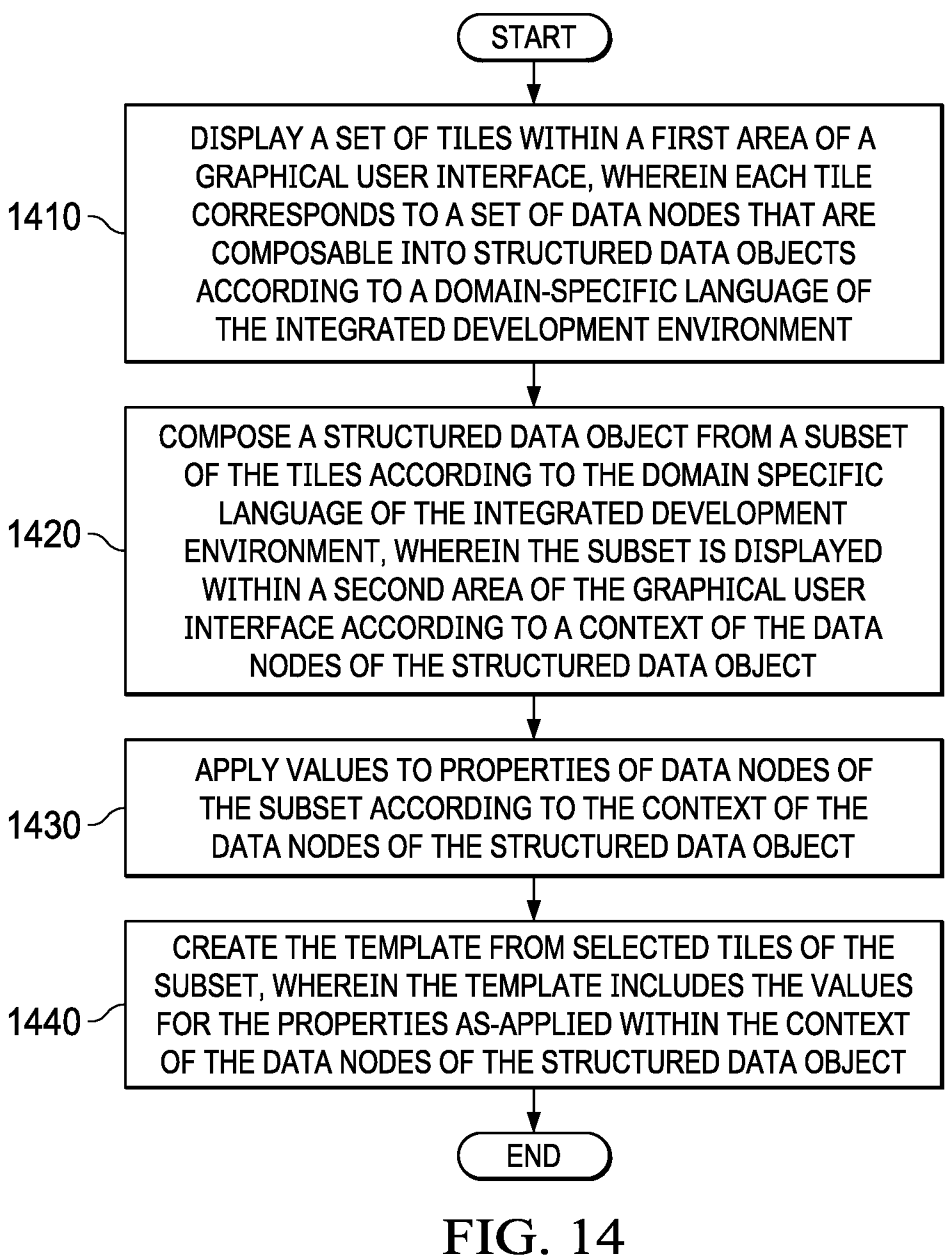
FIG. 14 is a flowchart of a process for creating a template in an integrated development environment in accordance with an illustrative embodiment.

Turning next to FIG. 14, a flowchart of a process for creating a template in an integrated development environment is depicted in accordance with an illustrative embodiment. The process in FIG. 14 can be implemented in hardware, software, or both. When implemented in software, the process can take the form of program code that is run by one of more processor units located in one or more hardware devices in one or more computer systems. For example, the process can be implemented in template creator 204 for in computer system 206 in FIG. 2.

The process begins by displaying a set of tiles within a first area of a graphical user interface (step 1410). Each tile corresponds to a set of data nodes that are composable into structured data objects according to a domain-specific language of the integrated development environment.

The process composes a structured data object from a subset of the tiles according to the domain-specific language of the integrated development environment (step 1420). The subset is displayed within a second area of the graphical user interface according to a context of the data nodes of the structured data object.

The process applies values to properties of data nodes of the subset according to the context of the data nodes of the structured data object (step 1430).

The process creates the template from selected tiles of the subset (step 1440). The template includes the values for the properties as-applied within the context of the data nodes of the structured data object. The process terminates thereafter.

With reference next to FIG. 15, a process for creating a template from a selected subset of data nodes is depicted according to an illustrative example. The process in FIG. 15 can be implemented as part of one illustrative example of the process of FIG. 14.

Continuing from step 1430 of FIG. 14, the process identifies the selected tiles from the subset of the tiles displayed within the second area of the graphical user interface (step 1510). The template is created in response to identifying the selected tiles. The process continues to step 1440 of FIG. 14 thereafter.

With reference next to FIG. 16, a process for receiving template information is depicted according to an illustrative example. The process in FIG. 16 can be implemented as part of one illustrative example of the process of FIG. 14.

Continuing from step 1430 of FIG. 14, the process displays a modal overlying one or more of the first area, the second area, and the third area of the graphical user interface (step 1610). The process receives information about the template from within the modal (step 1620). The process continues to step 1440 of FIG. 14 thereafter.

With reference next to FIG. 17, a process for storing template information is depicted according to an illustrative example. The process in FIG. 17 can be implemented as part of one illustrative example of the process of FIG. 14.

Continuing from step 1440 of FIG. 14, the process stores the values as-applied within the context of the structured data object in association with the template of the selected tiles (step 1710). The process terminates thereafter.

Figure 18:
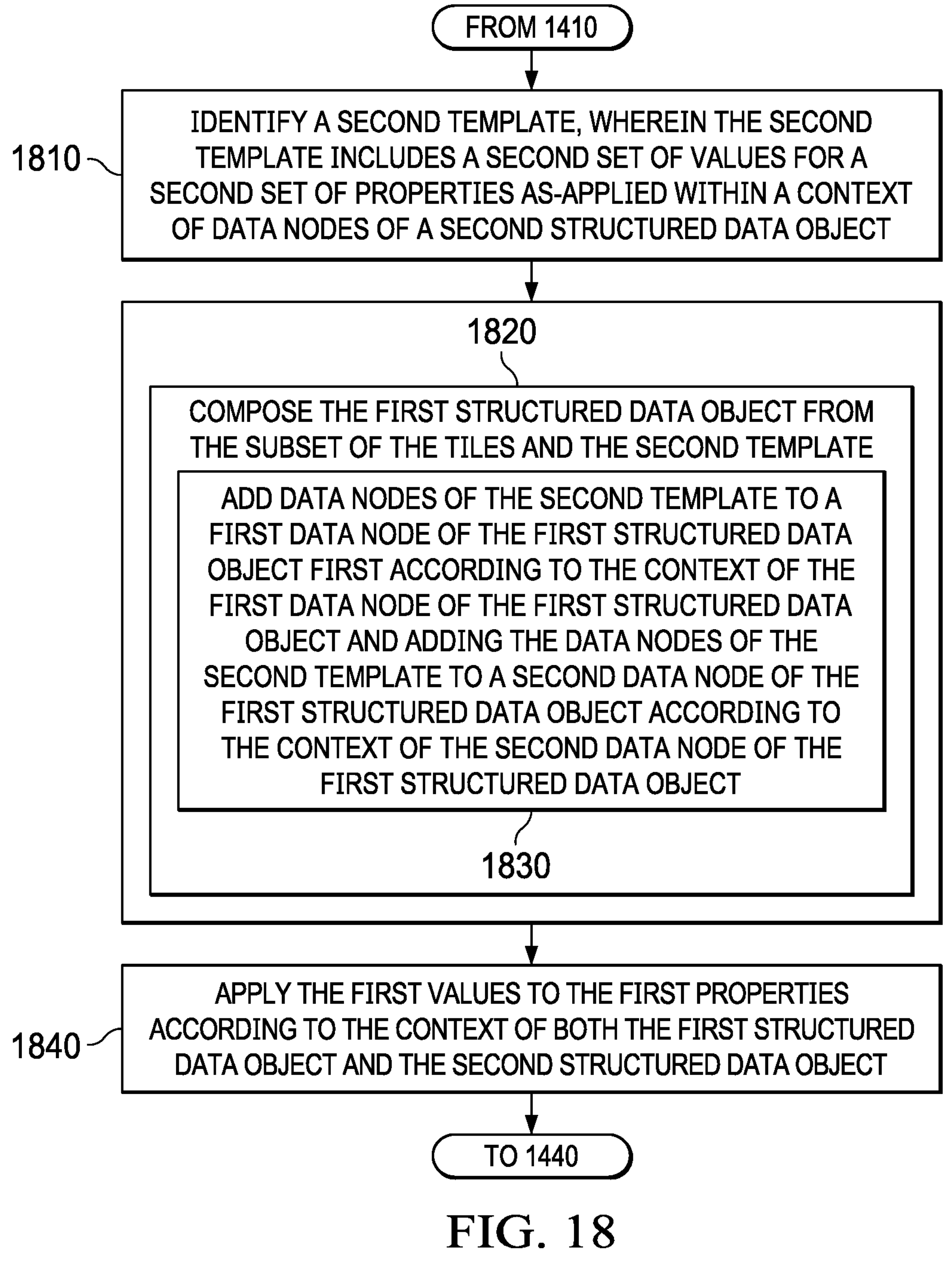
FIG. 18 is a flowchart of a process for creating a template from one or more existing templates according to an illustrative example.

With reference next to FIG. 18, a process for creating a template from one or more existing templates is depicted according to an illustrative example. The process of FIG. 18 can be implemented as part of one illustrative example of the process of FIG. 14.

Continuing from step 1410 of FIG. 14, the process identifies a second template (step 1810). The second template includes a second set of values for a second set of properties as-applied within a context of data nodes of a second structured data object. The process then continues to step 1420.

In one illustrative example, step 1420 includes composing the first structured data object from the subset of the tiles and the second template (step 1820). In one illustrative example, step 1820 includes simultaneously adding data nodes of the second template to a first data node of the first structured data object first according to the context of the first data node of the first structured data object and adding the data nodes of the second template to a second data node of the first structured data object according to the context of the second data node of the first structured data object (step 1830). The process then continues to step 1430.

In one illustrative example, step 1430 includes applying the first values to the first properties according to the context of both the first structured data object and the second structured data object (step 1840). Thereafter, the process continues to step 1440 of FIG. 14.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks can be implemented as program code, hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams can be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession can be performed substantially concurrently, or the blocks may sometimes be performed in the reverse order, depending upon the functionality involved. Also, other blocks can be added in addition to the illustrated blocks in a flowchart or block diagram.

Figure 19:
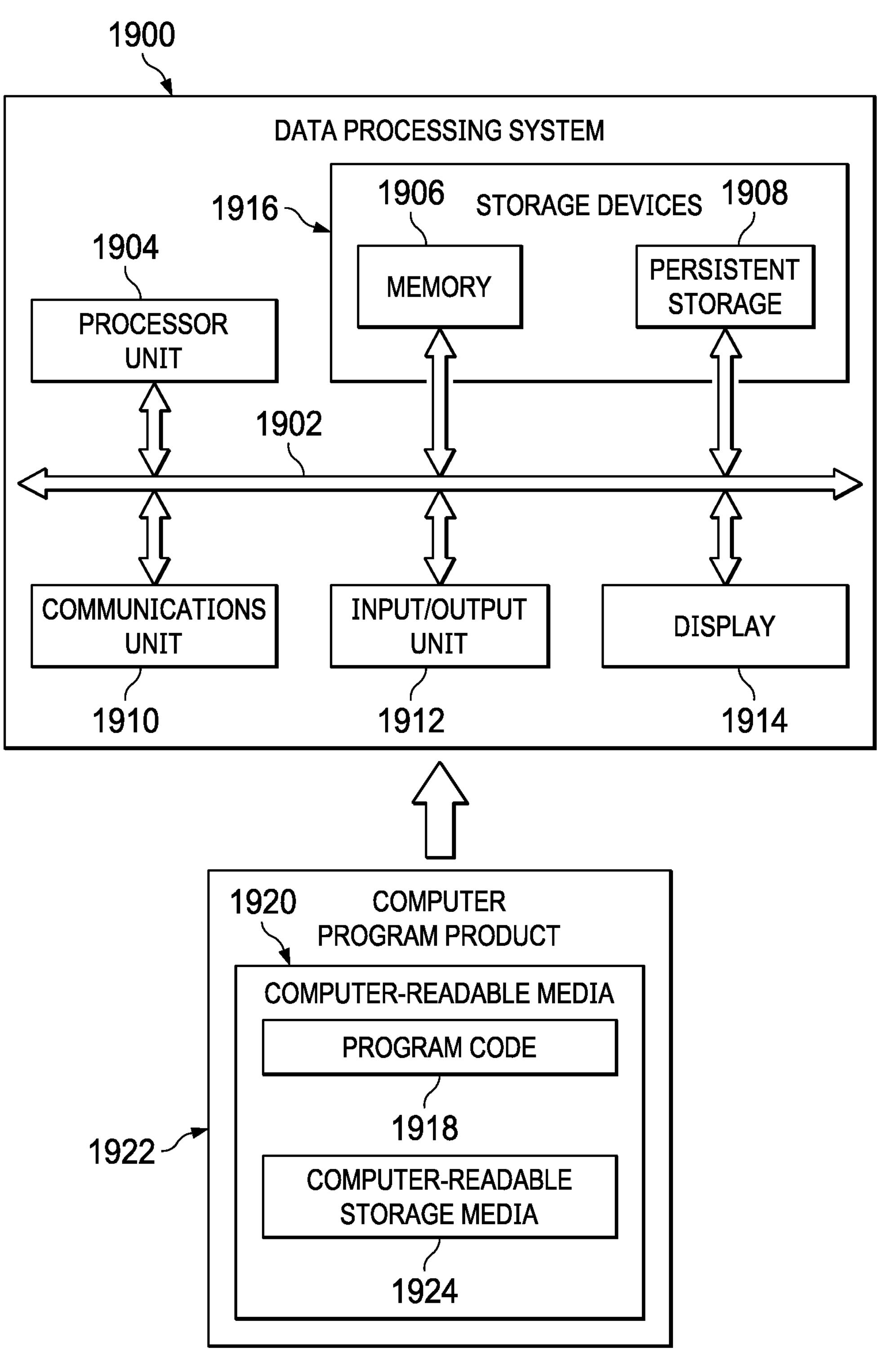
FIG. 19 is a block diagram of a data processing system in accordance with an illustrative embodiment.

Turning now to FIG. 19, a block diagram of a data processing system is depicted in accordance with an illustrative embodiment. Data processing system 1900 can be used to implement server computer 104, server computer 106, client devices 110, in FIG. 1. Data processing system 1900 can also be used to implement computer system 206 of FIG. 2. In this illustrative example, data processing system 1900 includes communications framework 1902, which provides communications between processor unit 1904, memory 1906, persistent storage 1908, communications unit 1910, input/output (I/O) unit 1912, and display 1914. In this example, communications framework 1902 takes the form of a bus system.

Processor unit 1904 serves to execute instructions for software that can be loaded into memory 1906. Processor unit 1904 includes one or more processors. For example, processor unit 1904 can be selected from at least one of a multicore processor, a central processing unit (CPU), a graphics processing unit (GPU), a physics processing unit (PPU), a digital signal processor (DSP), a network processor, or some other suitable type of processor. Further, processor unit 1904 can may be implemented using one or more heterogeneous processor systems in which a main processor is present with secondary processors on a single chip. As another illustrative example, processor unit 1904 can be a symmetric multi-processor system containing multiple processors of the same type on a single chip.

Memory 1906 and persistent storage 1908 are examples of storage devices 1916. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 1916 may also be referred to as computer-readable storage devices in these illustrative examples. Memory 1906, in these examples, can be, for example, a random-access memory or any other suitable volatile or non-volatile storage device. Persistent storage 1908 may take various forms, depending on the particular implementation.

For example, persistent storage 1908 may contain one or more components or devices. For example, persistent storage 1908 can be a hard drive, a solid-state drive (SSD), a flash memory, a rewritable optical disk, a rewritable magnetic tape, or some combination of the above. The media used by persistent storage 1908 also can be removable. For example, a removable hard drive can be used for persistent storage 1908.

Communications unit 1910, in these illustrative examples, provides for communications with other data processing systems or devices. In these illustrative examples, communications unit 1910 is a network interface card.

Input/output unit 1912 allows for input and output of data with other devices that can be connected to data processing system 1900. For example, input/output unit 1912 may provide a connection for user input through at least one of a keyboard, a mouse, or some other suitable input device. Further, input/output unit 1912 may send output to a printer. Display 1914 provides a mechanism to display information to a user.

Instructions for at least one of the operating system, applications, or programs can be located in storage devices 1916, which are in communication with processor unit 1904 through communications framework 1902. The processes of the different embodiments can be performed by processor unit 1904 using computer-implemented instructions, which may be located in a memory, such as memory 1906.

These instructions are referred to as program code, computer usable program code, or computer-readable program code that can be read and executed by a processor in processor unit 1904. The program code in the different embodiments can be embodied on different physical or computer-readable storage media, such as memory 1906 or persistent storage 1908.

Program code 1918 is located in a functional form on computer-readable media 1920 that is selectively removable and can be loaded onto or transferred to data processing system 1900 for execution by processor unit 1904. Program code 1918 and computer-readable media 1920 form computer program product 1922 in these illustrative examples. In the illustrative example, computer-readable media 1920 is computer-readable storage media 1924.

In these illustrative examples, computer-readable storage media 1924 is a physical or tangible storage device used to store program code 1918 rather than a medium that propagates or transmits program code 1918. The term "non-transitory" or "tangible", as used herein, is a limitation of the medium itself (i.e., tangible, not a signal) as opposed to a limitation on data storage persistency (e.g., RAM vs. ROM). Computer-readable storage media 1924, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Alternatively, program code 1918 can be transferred to data processing system 1900 using a computer-readable signal media. The computer-readable signal media can be, for example, a propagated data signal containing program code 1918. For example, the computer-readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

Further, as used herein, "computer-readable media 1920" can be singular or plural. For example, program code 1918 can be located in computer-readable media 1920 in the form of a single storage device or system. In another example, program code 1918 can be located in computer-readable media 1920 that is distributed in multiple data processing systems. In other words, some instructions in program code 1918 can be located in one data processing system while other instructions in program code 1918 can be located in one data processing system. For example, a portion of program code 1918 can be located in computer-readable media 1920 in a server computer while another portion of program code 1918 can be located in computer-readable media 1920 located in a set of client computers.

The different components illustrated for data processing system 1900 are not meant to provide architectural limitations to the manner in which different embodiments can be implemented. In some illustrative examples, one or more of the components may be incorporated in or otherwise form a portion of, another component. For example, memory 1906, or portions thereof, may be incorporated in processor unit 1904 in some illustrative examples. The different illustrative embodiments can be implemented in a data processing system including components in addition to or in place of those illustrated for data processing system 1900. Other components shown in FIG. 19 can be varied from the illustrative examples shown. The different embodiments can be implemented using any hardware device or system capable of running program code 1918.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, To the extent that terms "includes", "including", "has", "contains", and variants thereof are used herein, such terms are intended to be inclusive in a manner similar to the term "comprises" as an open transition word without precluding any additional or other elements.

The descriptions of the various embodiments of the present invention have been presented for purposes of illustration, but are not intended to be exhaustive or limited to the embodiments disclosed. Not all embodiments will include all of the features described in the illustrative examples. Further, different illustrative embodiments may provide different features as compared to other illustrative embodiments. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

What is claimed is:

1. A system to construct templates that build applications, comprising:
- one or more processors, coupled with memory, to:
- display, within a graphical user interface, a tile comprising a plurality of data nodes that are composable into structured data objects according to a domain-specific language;
- receive, via the graphical user interface, an indication to construct a template from a subset of the plurality of data nodes;
- display, via the graphical user interface, the subset of the plurality of data nodes responsive to the indication to construct the template from the subset of the plurality of data nodes;
- identify a web service defined by the subset of the plurality of data nodes;
- request, from the web service, and based on a context of the subset of the plurality of data nodes, additional contextual information of the subset of the plurality of data nodes;
- receive, from the web service, responsive to the request, the additional contextual information;
- compose a structured data object from the subset of the plurality of data nodes with the additional contextual information received from the web service;
- responsive to composition of the structured data object:
  - i) add data nodes to multiple data nodes of the structured data object, and
  - ii) apply, to each of the added data nodes, property values according to an individual context of a corresponding one of the multiple data nodes;
- display, via the graphical user interface, a modal comprising an attach image area to drag images;
- receive, within the modal, information about the template, the information comprising a name of the template, a description of the template, a use case, a practice, a recommendation, and an instruction;
- construct the template with the structured data object including the added data nodes and the information about the template, the template configured to build, without compilation, an application in accordance with the additional contextual information of the subset of the plurality of data nodes; and
- execute, by a metadata interpreter for the domain-specific language, without compilation, the structured data object of the template to build the application with user interface elements in accordance with the additional contextual information.

2. The system of claim 1, comprising the one or more processors to:

display the tile in a first area of the graphical user interface; and display the subset of the plurality of data nodes in a second area of the graphical user interface, the second area different from the first area.

3. The system of claim 1, comprising:

the one or more processors to execute, without compilation, the structured data object of the template via an abstract syntax tree interpreter.

4. The system of claim 1, comprising:

the one or more processors to replace compilation with the composed structured data object of the template, wherein compilation comprises tokenization and parsing.

5. The system of claim 1, comprising:

the one or more processors to execute a user interface engine orchestrator configured as a proxy for a user interface engine that displays the graphical user interface, the user interface engine orchestrator configured to:

identify sources of data for queries associated with the plurality of data nodes;

execute the queries to obtain the data from the sources; and cache the obtained data in the memory.

6. The system of claim 5, comprising:

the one or more processors to compose the structured data object using at least a portion of the obtained data cached in the memory.

7. The system of claim 1, comprising the one or more processors to:

duplicate the template responsive to an indication, received via the graphical user interface, to edit the template; and edit one or more blocks on the duplicated template, without editing the template.

8. The system of claim 1, comprising the one or more processors to:

maintain, in a tree structure, a state of the graphical user interface, the state of the graphical user interface comprising the plurality of data nodes, the tile, and the context;

listen for a change in the state of the tree structure; and update a portion of the graphical user interface corresponding to the change in the state of the tree structure.

9. The system of claim 8, wherein the change in the state of the tree structure corresponds to the additional contextual information received from the web service responsive to the request.

10. The system of claim 1, comprising the one or more processors to:

identify a second template comprising values for a set of properties as-applied within a context of second data nodes of a second structured data object; and compose the structured data object from the subset of the tile and based on: i) adding data nodes of the second template to a first data node of the structured data object according to the context of the first data node of the structured data object, and ii) adding the data nodes of the second template to a second data node of the structured data object according to the context of the second data node of the structured data object as opposed to the context of the second structured data object.

11. The system of claim 1, wherein to execute the structured data object, the one or more processors further:

update a user interface state tree and re-render tiles corresponding to a change in a state due to the execution of the structured data object.

12. The system of claim 11, wherein the one or more processors further:

re-render only the tiles corresponding to the change in the state, thereby reducing processing workload and improving performance of the system.

13. A method of constructing templates that build applications, comprising:

displaying, by one or more processors coupled with memory, within a graphical user interface, a tile comprising a plurality of data nodes that are composable into structured data objects according to a domain-specific language;

receiving, by the one or more processors, via the graphical user interface, an indication to construct a template from a subset of the plurality of data nodes;

displaying, by the one or more processors, via the graphical user interface, the subset of the plurality of data nodes responsive to the indication to construct the template from the subset of the plurality of data nodes;

identifying, by the one or more processors, a web service defined by the subset of the plurality of data nodes;

requesting, by the one or more processors, from the web service, and based on a context of the subset of the plurality of data nodes, additional contextual information of the subset of the plurality of data nodes;

receiving, by the one or more processors, from the web service, responsive to the request, the additional contextual information;

composing, by the one or more processors, a structured data object from the subset of the plurality of data nodes with the additional contextual information received from the web service;

responsive to composition of the structured data object:

i) adding data nodes to multiple data nodes of the structured data object, and ii) applying, to each of the added data nodes, property values according to an individual context of a corresponding one of the multiple data nodes;

displaying, by the one or more processors, via the graphical user interface, a modal comprising an attach image area to drag images;

receiving, by the one or more processors, within the modal, the information comprising a name of the template, a description of the template, a use case, a practice, a recommendation, and an instruction;

constructing, by the one or more processors, the template with the structured data object included the added data nodes and the information about the template, the template configured to build, without compilation, an application in accordance with the additional contextual information of the subset of the plurality of data nodes; and executing, by the one or more processors, via a metadata interpreter for the domain-specific language, without compilation, the structured data object of the template to build the application with user interface elements in accordance with the additional contextual information.

14. The method of claim 13, comprising the one or more processors to:

display the tile in a first area of the graphical user interface; and display the subset of the plurality of data nodes in a second area of the graphical user interface, the second area different from the first area.

15. The method of claim 13, comprising:

executing, by the one or more processors, without compilation, the structured data object of the template via an abstract syntax tree interpreter.

16. The method of claim 13, comprising:

replacing, by the one or more processors, compilation with the composed structured data object of the template, wherein compilation comprises tokenization and parsing.

17. The method of claim 13, comprising:

executing, by the one or more processors, a user interface engine orchestrator configured as a proxy for a user interface engine that displays the graphical user interface;

identifying, by the user interface engine orchestrator, sources of data for queries associated with the plurality of data nodes;

executing, by the user interface engine orchestrator, the queries to obtain the data from the sources; and caching, by the user interface engine orchestrator, the obtained data in the memory.

18. The method of claim 17, comprising:

composing, by the one or more processors, the structured data object using at least a portion of the obtained data cached in the memory.

19. The method of claim 13, comprising:

duplicating, by the one or more processors, the template responsive to an indication, received via the graphical user interface, to edit the template; and editing, by the one or more processors, one or more blocks on the duplicated template, without editing the template.

20. A non-transitory computer readable medium storing processor executable instructions that, when executed by one or more processors, cause the one or more processors to:

display, within a graphical user interface, a tile comprising a plurality of data nodes that are composable into structured data objects according to a domain-specific language;

receive, via the graphical user interface, an indication to construct a template from a subset of the plurality of data nodes;

display, via the graphical user interface, the subset of the plurality of data nodes responsive to the indication to construct the template from the subset of the plurality of data nodes;

identify a web service defined by the subset of the plurality of data nodes;

request, from the web service, and based on a context of the subset of the plurality of data nodes, additional contextual information of the subset of the plurality of data nodes;

receive, from the web service, responsive to the request, the additional contextual information;

compose a structured data object from the subset of the plurality of data nodes with the additional contextual information received from the web service;

responsive to composition of the structured data object:

i) add data nodes to multiple data nodes of the structured data object, and ii) apply, to each of the added data nodes, property values according to an individual context of a corresponding one of the multiple data nodes;

display, via the graphical user interface, a modal comprising an attach image area to drag images;

receive, within the modal, information about the template, the information comprising a name of the template, a description of the template, a use case, a practice, a recommendation, and an instruction;

construct the template with the structured data object including the added data nodes and the information about the template, the template configured to build, without compilation, an application in accordance with the additional contextual information of the subset of the plurality of data nodes; and execute, via a metadata interpreter for the domain-specific language, without compilation, the structured data object of the template to build the application with user interface elements in accordance with the additional contextual information.

* * * * *